United States Patent [19]

Matsuoka

[11] Patent Number: 6,038,537
[45] Date of Patent: Mar. 14, 2000

[54] INTRA-ORGANIZATION COOPERATION SYSTEM, COMMODITY DEAL MANAGEMENT METHOD, AND STORAGE MEDIUM

[75] Inventor: Hidetoshi Matsuoka, Kawasaki, Japan

[73] Assignee: Fujitsu Limited, Kawasaki, Japan

[21] Appl. No.: 08/982,464

[22] Filed: Dec. 2, 1997

[30] Foreign Application Priority Data

Mar. 19, 1997 [JP] Japan ................................. 9-065944

[51] Int. Cl.⁷ .................................................. G06F 17/60
[52] U.S. Cl. .................................... 705/7; 705/8; 705/9
[58] Field of Search ....................................... 705/7, 8, 9

[56] References Cited

U.S. PATENT DOCUMENTS 5,799,286  8/1998  Morgan et al. ............................ 705/30
5,930,764  7/1999  Melchione et al. ....................... 705/10

FOREIGN PATENT DOCUMENTS 88139854  6/1988  Japan .

OTHER PUBLICATIONS

Levine, Harvey A., 'Project Goals Shifting Toward Enterprise Goals', Software Magazine, v11n15, pp. 95–100, Dec. 1991.

'Cincom's multi–user project management system for VAX, 370 plugs Netmaster gap. (Cincom UK's Cincom Project Control System) (product announcement)', Computergram International, n1426, pCGI05160002, May 16, 1990.

HP Office Information Software Products Offer Advanced PC Intergration, Dateline: Palo Alto, CA, Dec. 8, 1986.

Sanchez, Ron; Heene, Aime, 'Managing for an uncertain future: a systems view of strategic organizational change. (Preparing for the Future: Developing Strategic Flexibility from a Competence–Based Perspective)', International Studies of Management & O, 1997.

Judy McDonald, Product Name: Synchronize 2.0 (326496), CrossWind Technologies Inc, Santa Cruz, Ca.

*Primary Examiner*—Allen R. MacDonald
*Assistant Examiner*—Akiba Robinson-Boyce
*Attorney, Agent, or Firm*—Staas & Halsey LLP

[57] ABSTRACT

An intra-organization cooperation system is a system for making departments/sections smoothly perform a transaction support to mutually provide information, services, equipment etc., within an organization. It comprises a personal information database registering a balance of commodities of each of the members belonging to the organization, and a commodity information database storing commodity information of each commodity. Additionally, the present system determines the degree of association between a commodity provider and a commodity receiver and the scale of the deal of a commodity when the deal of the commodity is made, and decides the contents of the deal of the commodity according to the results of determination of either or both of the results of determination. Then, it makes the deal according to the decided contents of the deal of the commodity, and updates the personal information database.

43 Claims, 20 Drawing Sheets

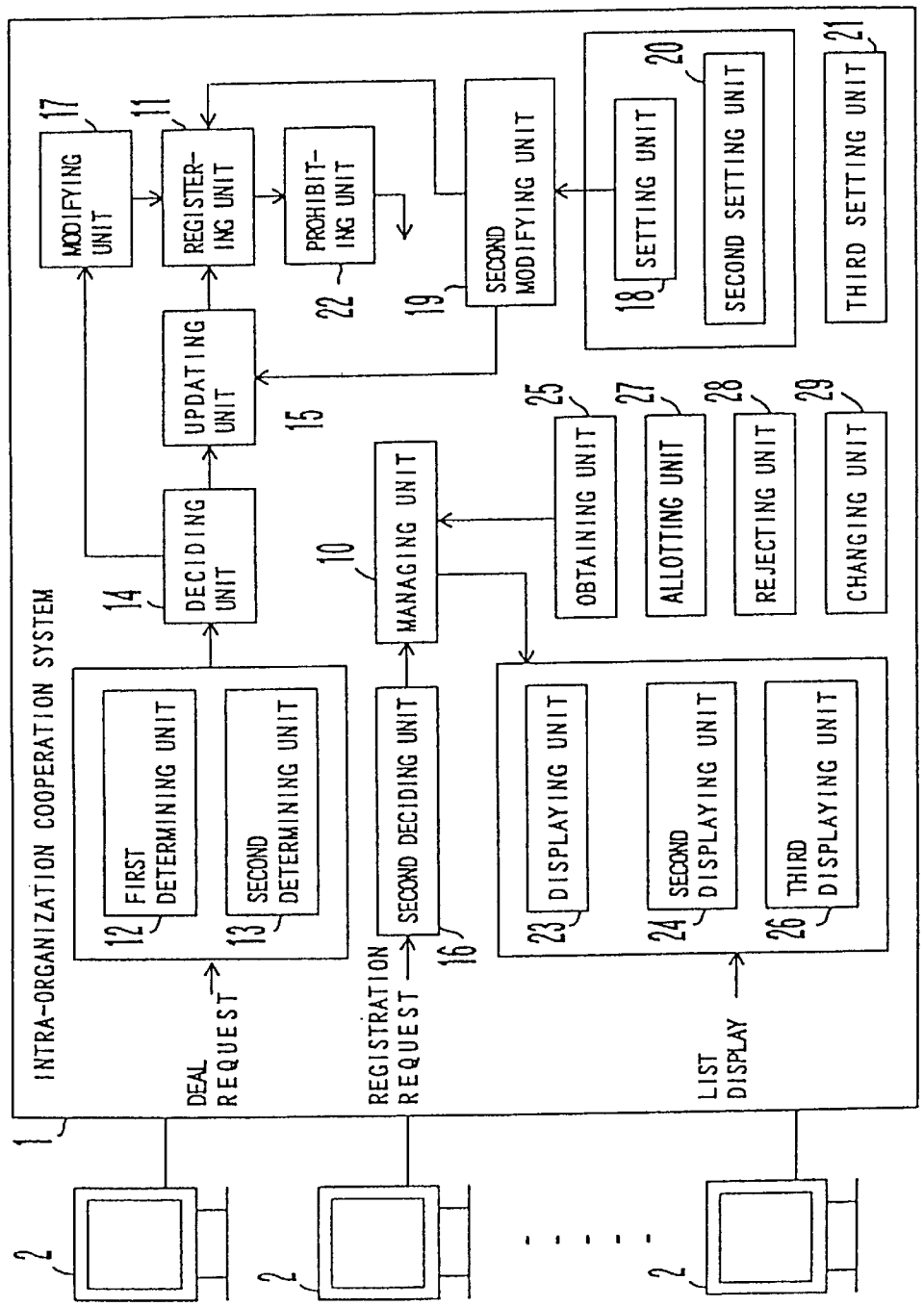
F I G. 2A

| NAME OF PERSON | BALANCE | SECTION | DEBT | SECURITY |
|---|---|---|---|---|
| TARO | 500 | C SECTION, B DEPARTMENT, A DIVISION | 100 | LABOR FOR 50 HRS |
| JIRO | 50 | D SECTION, B DEPARTMENT, A DIVISION | | |
| HANAKO | 200 | F SECTION, E DEPARTMENT, A DIVISION | | |
| ... | ... | ... | ... | ... |

52

F I G. 5

| NAME OF COMMODITY | PURCHASER | PRICE | REPUTATION VALUE | DEAL DATE |
|---|---|---|---|---|
| COMMODITY c | JIRO | 100 | 3.0 | JANUARY 10, 1997 |
| COMMODITY c | TARO | 100 | 4.5 | FEBRUARY 10, 1997 |
| COMMODITY a | TARO | 200 | 3.0 | MARCH 10, 1997 |
| ... | ... | ... | ... | ... |

53

F I G. 6

| NAME OF COMMODITY | SPECIFICATION | PROVIDER | PRICE | LABOR TIME | COST |
|---|---|---|---|---|---|
| COMMODITY a | INFORMATION ① | HANAKO | 200 | 30 HRS | ¥10,000 |
| COMMODITY b | INFORMATION ② | TARO | 100 | 5 HRS | ¥0 |
| COMMODITY c | INFORMATION ③ | HANAKO | 200 FOR THIS MONTH, 180 AFTER THIS MONTH | 10 HRS | ¥0 |
| COMMODITY d | INFORMATION ④ | JIRO | MIN(50, 500/NUMBER OF COMMODITY RECEIVERS) | 15 HRS | ¥0 |
| ... | ... | ... | ... | ... | ... |

54

| BRAND NAME | ESSENTIAL COMMODITY | REGISTRATION DATE |
|---|---|---|
| HANA | | JANUARY 10, 1997 |
| TATA | COMMODITY 1 | JANUARY 31, 1997 |
| HANA | | FEBRUARY 10, 1997 |
| JIJI | ... | FEBRUARY 28, 1997 |
| | ... | ... |

| NAME OF COMMODITY | SPECIFICATION | PRICE |
|---|---|---|
| COMMODITYa | INFORMATION ① | 200 |
| COMMODITYb | INFORMATION ② | 100 |
| ⋮ | ⋮ | ⋮ |

F I G. 9 A

80

| NAME OF COMMODITY | SPECIFICATION | PRICE | BRAND NAME |
|---|---|---|---|
| COMMODITYa | INFORMATION ① | 200 | H A N A |
| COMMODITYb | INFORMATION ② | 100 | T A T A |
| ⋮ | ⋮ | ⋮ | ⋮ |

F I G. 9 B

90

| NAME OF COMMODITY | SPECIFICATION | PRICE | BRAND NAME | REPUTATION VALUE |
|---|---|---|---|---|
| COMMODITYa | INFORMATION ① | 200 | H A N A | 3.0 |
| COMMODITYb | INFORMATION ② | 100 | T A T A | 4.0 |
| ⋮ | ⋮ | ⋮ | ⋮ | ⋮ |

F I G. 9 C

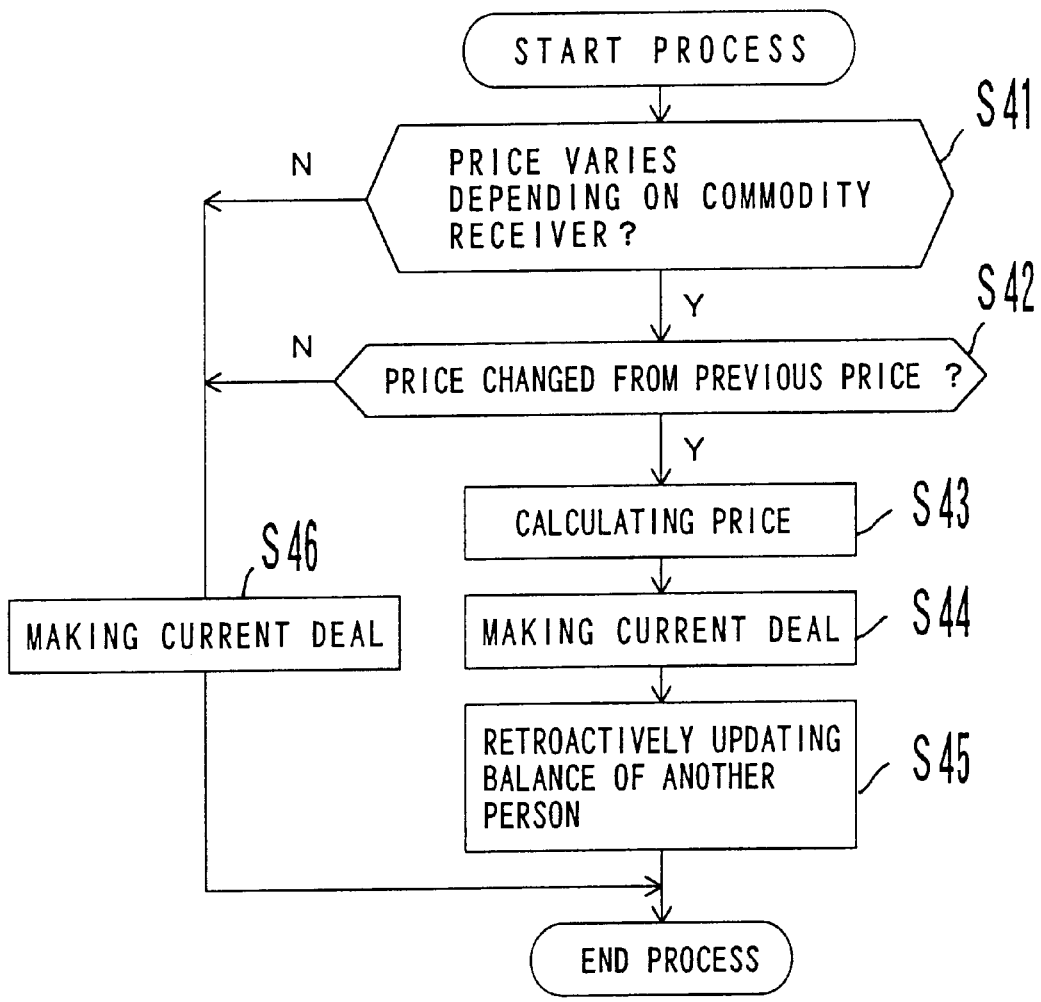
F I G. 1 2

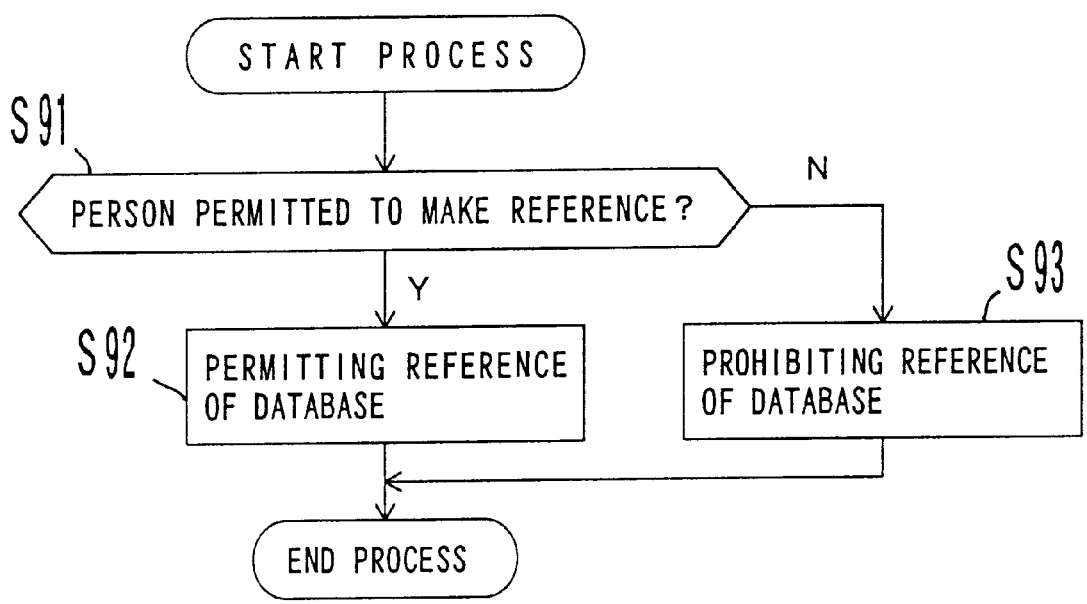
F I G. 1 7

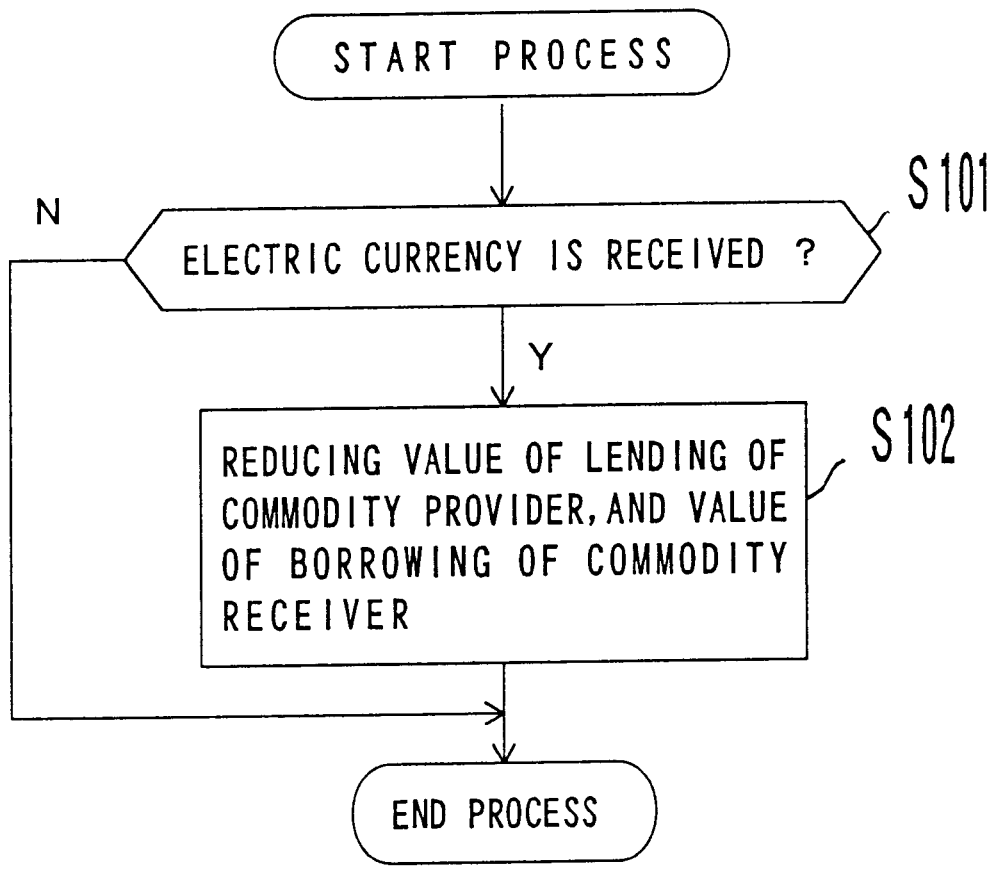
F I G. 1 8

INTRA-ORGANIZATION COOPERATION SYSTEM, COMMODITY DEAL MANAGEMENT METHOD, AND STORAGE MEDIUM

BACKGROUND OF THE INVENTION

1. Field of the Invention

The present invention relates to an intra-organization cooperation system and a commodity deal management method for realizing a transaction support of knowledge or labor which are difficult to grasp because they are scattered in a large organization, change significantly and impose a considerable load on a cooperator, without having a bad influence on a conventional style of organization based on an instruction issued by a manager.

2. Description of the Related Art

Members belonging to an organization sometimes carry out a transaction by mutually providing various items of information (such as knowledge, know-how, programs, documents etc.) and various types of labor (such as cooperation, service, maintenance etc.), without asking for the advice of a manager within a range in which they do not deviate from an original instruction from the manager.

An organization normally has a hierarchical structure as shown in FIG. 1. Circles shown in this figure (FIG. 1) indicate the members of the organization. A member at an upper location is a manager of the members at lower locations.

An actual organization is not often in such good order as that shown in FIG. 1. A manager sometimes belongs to a plurality of departments/sections, and concurrently holds a plurality of posts. Or, a manager heading members in separate or traverse departments/sections sometimes exists. However, the organization for a certain job or in a certain period may be close to that shown in this figure (FIG. 1). Considering only the relationship between a manager having strong leadership and his or her subordinate, it is approximate to the relationship shown in FIG. 1.

In an organization having such a structure, there are several methods for mutually providing various items of information and various types of labor between members.

(1) Within an organization, the provision of information or labor must be basically given via a top-down channel. Conventional organizations obey this principle.

However, an instruction is issued for large scale or high cost transactions but it is not issued for small scale or low cost transactions. For cooperation between departments/sections which are separate in an organization, a manager heading both of the departments/sections is normally in a considerably high position. Therefore, almost no instruction is issued for small scale or low cost transactions.

(2) Especially, in one department/section in an organization, one member can spontaneously provide information or labor which is helpful to another member. Even if it imposes a temporary load on the one member, it does not seem to be disadvantageous in consideration of a long-term association in the future.

However, if a request which will impose a load is made by a member who belongs to an unaffiliated department/section, or a member who will not likely be associated with again, it is difficult to accept the request. As a result, it becomes sectionalism.

(3) There is also a method for providing information or labor between members using a traverse support department/section such as an administration department or personnel or a computer center.

With this method, however, there is no corresponding or definitively responsible department/section if a transaction to be supported for the provision of the information or labor newly arises. Additionally, the transaction is not supported if a responsible department/section does not give support to be part of its responsibility.

(4) There is a method for revealing knowledge etc., of each department/section within a company owing to the recent development of a computer network within a company. This method is effective only when knowledge is revealed. This is because new labor does not occur.

With this method, however, a department or a section having certain knowledge or specialty cannot work for another department/section by spontaneously contriving a method for applying the knowledge or specialty, so as to improve the overall efficiency of an organization. This is because it is difficult to properly evaluate the case in which a department or a section to which an original duty is assigned works for another department/section for another task.

(5) Especially, when a computer network exists within a company, cooperation for another department/section, which is called volunteer work or a volunteer person, is given. The volunteer work or the volunteer person manifests the cooperation or a person who makes the cooperation by applying his or her own knowledge or specialty to another department/section.

However, since how to evaluate a volunteer person has not been determined yet, this method is limited to the case in which the number of people who participate as volunteers is small, or the case in which the load on a person who participates as a volunteer is extremely light, or a task in which volunteers are interested.

(6) There is a method for analyzing the flow of a transaction in an organization, finding a portion to which provision of information or labor is difficult by using a method called a BPR, and improving that portion, for example, by changing the organization.

With this method, however, the difficulty in the provision of information or labor cannot be found in a task (task; cooperation or an object to be provided, by applying own knowledge or specialty) which requires the provision even though its scale may not be so large, or in a task to which some members require the provision, or at the time of the occurrence of the necessity of providing the information and labor in a very short period.

(7) A joint project is sometimes carried out in a plurality of separate departments/sections. Normally, participating departments/sections have some advantages, or receive a "top-down" instruction.

However, it is difficult to participate in a department/section which has no advantage, even if the department/section at a participation destination is given an advantage.

(8) In the meantime, regarding the outside of an organization, the provision of knowledge and labor which are scattered and difficult to grasp, significantly changes, or imposes a considerable load on a cooperator, is realized with high efficiency by paying an equivalent cost.

However, if such a marketing principle is applied to an organization, a subordinate may not obey his or her manager, the working relationship deteriorates, a task which does not make a profit for some time is difficult to carry out, duplicate tasks may be developed within a company. That is, disadvantages rather than advantages exist. Therefore, the marketing principle cannot be applied to the organization as it is.

Especially, transactions in large organizations have diversified and rapidly changed in recent years.

Accordingly, the number of opportunities requiring transaction support, such as knowledge or labor which are scattered in a huge organization and difficult to grasp, cannot be coped with by changing an organization due to a rapid change, and cannot be supported by a volunteer because the considerable load imposed on a cooperator has increased.

The above described conventional technology, however, does not implement a method for coping with such a case.

SUMMARY OF THE INVENTION

An object of the present invention is to provide an intra-organization cooperation system for realizing a transaction support using knowledge, labor etc., which is performed for other than a normal transaction instructed via a conventional instruction channel in an organization, without having a bad influence on transactions/human relationships based on the above described instruction channel.

The intra-organization cooperation system according to the present invention comprises a personal information registering unit for registering the balance of a commodity for each member belonging to an organization; a commodity information storing unit for storing at least the price of a commodity as the commodity information of each commodity; a first determining unit for determining the degree of association between a commodity provider and a commodity receiver when a deal request for a commodity is issued; a second determining unit for determining the scale of a deal of the commodity when the deal request of the commodity is issued; a deciding unit for deciding the contents of a commodity deal according to the result of determination made by the first and second determining units; and an updating unit for updating the balance registered to the personal information registering unit according to the result of decisions made by the deciding unit.

The above described intra-company cooperation system determines the degree of association between a commodity provider and a commodity receiver, and the scale of a deal of a commodity by using the respective first and second determining units, in order to make departments/sections smoothly perform a transaction support for mutually providing commodities such as information, service, equipment etc., between the departments/sections within an organization. It decides the contents of the deal of the commodity according to the result of determination made by the determining units.

The contents of the deal of the commodity is, for example, any of the prices of commodities stored in the commodity information storing unit as the values of lending and borrowing incurred by the deal of the commodity as it is, the price obtained by subtracting a certain amount of money from the price, and "0". Otherwise, the deal of the commodity itself may be prohibited.

BRIEF DESCRIPTION OF THE DRAWING

FIGS. 2A and 2B are schematic diagrams showing the configuration of an intra-organization cooperation system;

FIG. 5 exemplifies a personal information database;

FIG. 6 exemplifies a deal registration database;

FIG. 7 exemplifies a commodity information database;

FIGS. 9A through 9C are tables for explaining a commodity list screen;

FIG. 12 is a flowchart showing a process for executing an intra-organization cooperation implementation program;

FIG. 17 is a flowchart showing a process for executing an intra-organization cooperation implementation program; and FIG. 18 is a flowchart showing a process for executing an intra-organization cooperation implementation program.

DESCRIPTION OF THE PREFERRED EMBODIMENTS

Figure 2B:
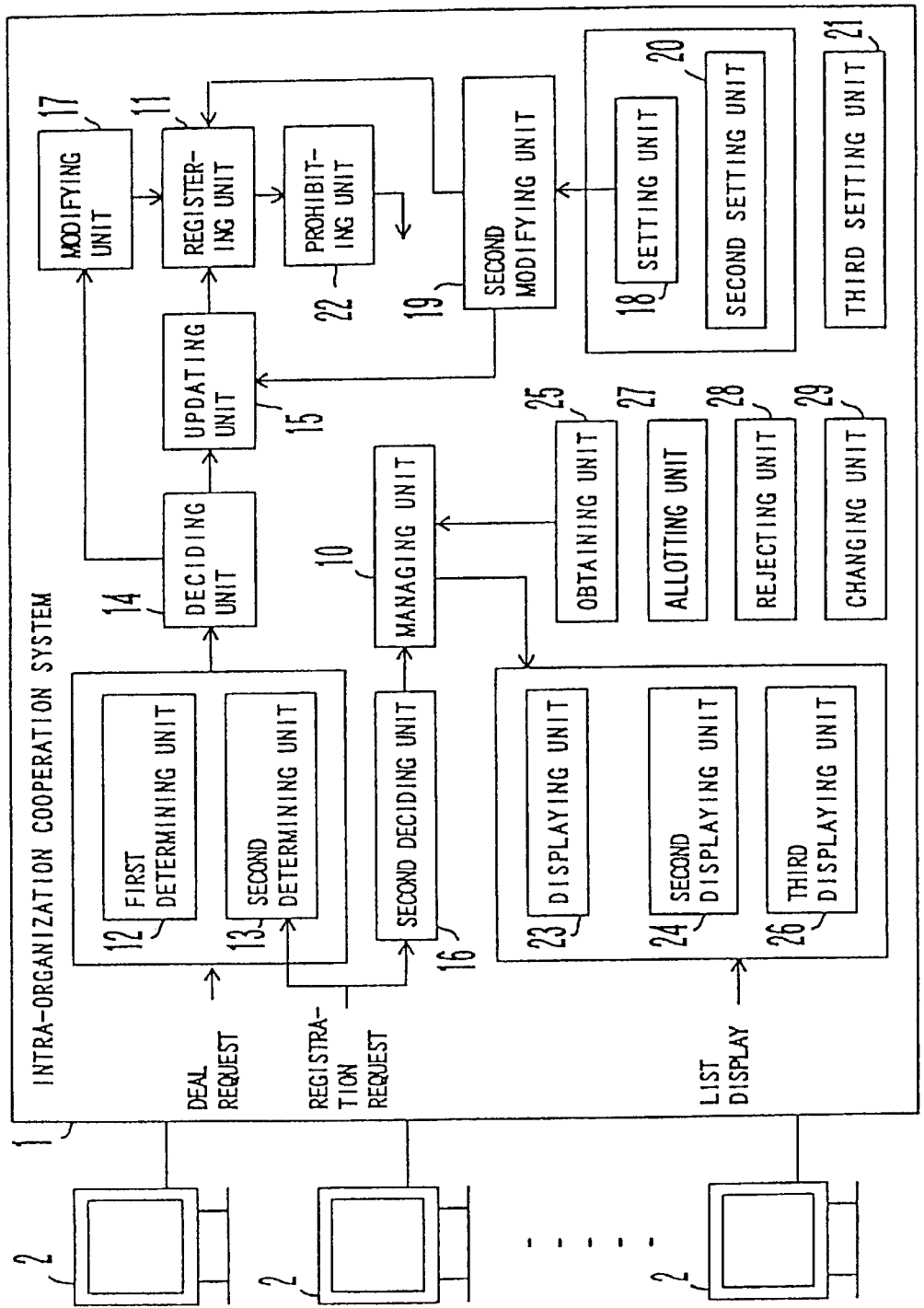

FIGS. 2A and 2B are schematic diagrams showing the principle of the present invention.

Figure 1:
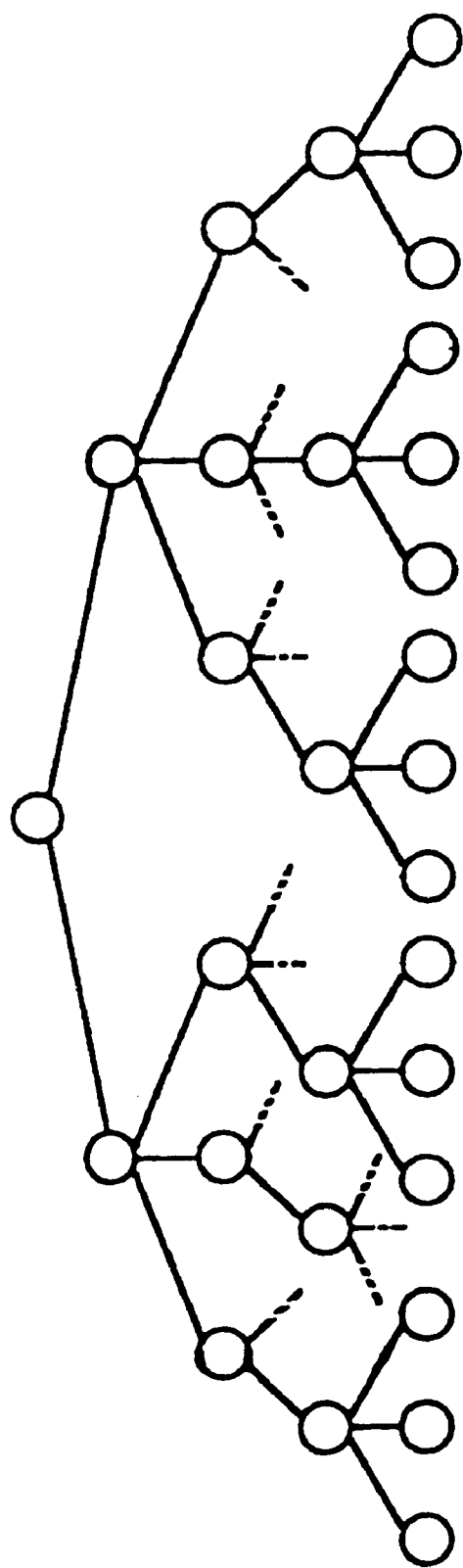
FIG. 1 is a schematic diagram for explaining the structure of an organization.

In FIG. 2A, 1 indicates an intra-organization cooperation system according to the present invention.

It is intended to realize cooperation in an organization by electronically registering a deal of a commodity such as information, labor etc., which is lent or borrowed between members belonging to an organization.

This intra-organization cooperation system 1 realizes the cooperation in a small-scale transaction, for which a "top-down" instruction is not issued; cooperation with a member in a distant department/section; cooperation for a transaction whose responsible department/section cannot be determined; cooperation for a transaction which is requested by a member in a distant department/section, and imposes a heavy load; cooperation for a suddenly occurring transaction which requires cooperation at short notice and cooperation for a transaction which gives a temporary or direct advantage to only one side. This system realizes these types of cooperation with effect similar to that of a marketing economy, without giving a disadvantage when a conventional marketing economy is applied to an organization. 2 indicates a terminal included in the intra-organization cooperation system 1. It is intended to perform an interactive communication with a member belonging to an organization.

The intra-organization cooperation system 1 comprises a managing unit 10, registering unit 11, first determining unit 12, second determining unit 13, deciding unit 14, updating unit 15, second deciding unit 16, modifying unit 17, setting unit 18, second modifying unit 19, second setting unit 20, third setting unit 21, prohibiting unit 22, displaying unit 23, second displaying unit 24, obtaining unit 25, third displaying unit 26, allotting unit 27, rejecting unit 28 and a changing unit 29.

The managing unit 10 manages the information about a commodity to be lent or borrowed, which is registered by a commodity provider. Here, the commodity indicates the provision of, for example, the above described various items of information, or the various types of labor. Additionally, it may be the provision or rental of an article such as a piece of equipment etc. The registering unit 11 registers at least the balance of lending and borrowing of a commodity for each member, and preferably registers the values of lending, the value of borrowing and the balance of each deal for each member.

The first determining unit 12 determines the degree of association between a commodity provider and a commodity receiver when a deal request of a commodity is issued. It determines the degree of association between a commodity provider and a commodity receiver, for example, based on a department or a section to which the commodity provider and the commodity receiver belong. Or, it determines the degree of association between a commodity provider and a commodity receiver based on a deal history.

The second determining unit 13 determines the scale of a deal when a deal request of a commodity is issued. For example, it sets an upper limit of lending for a commodity based on either or both of cost and labor required for providing the commodity, and determines the scale of a deal by determining whether or not the value or the total of values of the lending incurred by the deal of the commodity exceeds the upper limit. Additionally, the second determining unit 13 determines the scale of a transaction by determining whether or not either or both of the labor and cost required for providing a commodity by the commodity provider in a predetermined period exceeds a stipulated upper limit. At this time, the unit may sometimes raise the upper limit for a black-ink commodity provider, and lower the upper limit for a red-ink commodity provider.

The deciding unit 14 decides whether the values of lending and borrowing incurred due to a commodity deal are left unchanged, whether or not a part or a whole of each of the values is subtracted, or whether or not the commodity deal itself is prohibited, according to the results of a determination made by the first and second determining units 12 and 13. Specifically, when the deciding unit 14 judges that the probability of occurrence of association is low and the scale of a deal is small, it decides the value of lending and borrowing incurred by a commodity deal is left unchanged. If the probability of occurrence of association is judged to be high, the deciding unit 14 decides that a part or the whole of the values are subtracted. If the scale of the deal is judged to be large, the deciding unit 14 decides that the commodity deal itself is prohibited. At this time, if the deciding unit 14 cannot make any of the above described decisions, it may sometimes make a temporary decision that the values of lending and borrowing are left unchanged.

The updating unit 15 updates data registered to the registering unit 11 according to the result of a decision made by the deciding unit 14.

When a registration request for a commodity to be dealt is issued from a commodity provider, the second deciding unit 16 decides whether or not to permit the registration of the commodity. For example, if it judges that either or both of labor or cost required for providing the commodity to which the registration request is made exceeds a stipulated upper limit, it decides that the commodity is not permitted to be registered. If the second deciding unit 16 judges that either or both of the labor and cost that a commodity provider requires to provide a commodity in a predetermined period exceeds a stipulated upper limit, it decides not to permit the commodity to which the registration request is issued. At this time, the second deciding unit 16 may sometimes perform the determination process by raising the upper limit for a commodity provider who gains a profit, and lowering the upper limit for a commodity provider who suffers a loss.

When the deciding unit 14 makes a temporary decision that the values of lending and borrowing incurred by a commodity deal to be made is left unchanged and that the temporary decision is later proved to be erroneous, the modifying unit 17 modifies the data which is updated by the updating unit 15 and registered to the registering unit 11 so that the data is correct.

The setting unit 18 sets the values of lending and borrowing of a commodity so that they may change, for example, depending on the number of commodity receivers.

When the setting unit 18 changes the values of lending and borrowing of a commodity, the second modifying unit 19 modifies the data registered to the registering unit 11 so that the value which was dealt before the change will become one after the change. The second setting unit 20 sets the values of lending and borrowing of a commodity to "0" or approximately "0" (values close to "0"), when a deal of the same commodity is made to the same commodity receiver at a second or subsequent time.

The third setting unit 21 permits to set a borrowing which enables the balance registered to the registering unit 11 to increase on the condition that security is given.

The prohibiting unit 22 prohibits a deal which makes further borrowing when a balance registered to the registering unit 11 reaches a stipulated negative value.

The displaying unit 23 displays a list of commodities to be provided while making the name of a commodity provider anonymous.

The second displaying unit 24 displays a list of commodities to be provided while assigning a temporary name to a commodity provider.

The obtaining unit 25 obtains reputation data of a commodity, which is provided from a commodity receiver, and registers it to the managing unit 10.

The third displaying unit 26 displays the quality of a commodity to be provided by displaying the reputation data obtained by the obtaining unit 25.

When a member other than a commodity provider changes a commodity provided by the commodity provider, the allotting unit 27 allots the value of lending incurred by the deal of the commodity to both the commodity provider and the member.

The rejecting unit 28 rejects a reference request of the data registered to the registering unit 11, which is issued by a member other than a member who is permitted to make a reference.

When a commodity receiver issues a currency to a commodity provider, the changing unit 29 changes the data registered to the registering unit 11 according to the currency.

With the above described intra-organization cooperation system 1, if a deal request of a commodity such as information, labor etc., is issued within an organization, the first determining unit 12 determines the degree of association between a commodity provider and a commodity receiver, and the second determining unit 13 determines the scale of the deal.

If the probability of occurrence of association is judged to be low and the scale of the deal is small as a result of determination, the deciding unit 14 decides to leave the values of lending and borrowing unchanged. If the probability of occurrence of association is determined to be high, the deciding unit 14 decides to subtract a part or a whole of the values of lending and borrowing. If the scale of the deal is determined to be large, the deciding unit 14 decides to prohibit the deal of the commodity itself. According to this result, the updating unit 15 updates a balance registered to the registering unit 11.

According to this process, for example, a member "A" provides a member "B" with a commodity, the member "A" has the value of lending "100", while the member "B" has the value of borrowing "100". If the member "A" has the value of borrowing "60" by receiving a commodity from a member "C", the member "C" has the value of lending "60" and the member A has the value of lending "40" in total.

If there is association within an organization, and/or if the scale of a deal of a commodity is large, a commodity which must be originally provided via a top-down instruction channel is processed by subtracting part of all of the values of lending and borrowing so that there is no profit made by the deal, or the deal of the commodity itself is prohibited.

Note that the total of all the values of lending incurred in one deal must be almost equal to the total of all the values of borrowing. However, part of the values of the borrowing of a commodity receiver may be recognized to be the value of lending of an organization as a tax. In this case, the value of borrowing of the commodity receiver is not always almost equal to the value of lending of the commodity provider.

The present system employs the configuration in which the values of lending and borrowing are registered. The registration of lending and borrowing is very much similar to an exchange of a currency. Since the former can intensively manage members having the right to rewrite the record of lending and borrowing, the record can be easily changed, examined and referenced. The latter can be implemented in the situation in which lending and borrowing cannot be registered, and can be kept private. However, both of them are very similar.

Since the registration of lending and borrowing, which has almost the same effect as that of an exchange of a currency when a transaction cooperation between members within an organization is made, the same principle as that of the marketing economy, which is performed daily outside the organization, is applied so that the organization will function cooperatively.

If the probability of occurrence of association is high such as within one department or one section at this time, the lending and borrowing are not registered even if a transaction cooperation is made.

Accordingly, the problem that human relationships become worse does not arise in such a range. For a transaction cooperation which requires relatively high cost and considerable labor, the loss caused due to an unsuccessful deal is large, or there is no time to engage in an original duty assigned by a manager. Or, the transaction cooperation must be coped with by changing an organization or by using the BPR. Since such a large-scale deal is prohibited, these problems will not occur.

The first determining unit 12 determines that the probability of occurrence of association between a commodity provider and a commodity receiver is high based on the department/section to which the commodity provider belongs and one to which a commodity receiver belongs, when they are close. In this way, the degree of association between a commodity provider and a commodity receiver can be determined with ease. For example, a storing unit for storing data indicating the structure of the organization, shown in FIG. 1, may exist, and determine the degree of association between departments/sections based on this data.

Additionally, the first determining unit 12 determines that the degree of association between a commodity provider and a commodity receiver is high when the number of previous deals, or that of deals made in a certain period, is large. This is because the frequency of deals is high. Additionally, if a considerable number of deals is made in a predetermined period and repeated many times, it is determined that the degree of association between a commodity provider and a commodity receiver is high. This is because the deals are continuous. In this way, the degree of association between a commodity provider and a commodity receiver can be determined with ease.

The second determining unit 13 sets an upper limit of lending according to either or both of labor and cost required for providing a commodity, and determines the scale of a deal by determining whether or not the value of lending incurred by a deal of the commodity, or the total values of lending, exceeds the upper limit.

The scale of a deal can be easily determined by limiting the total values of lending, according to the process for determining the scale of a deal. Specifically, a commodity provider "A" of a commodity "a" has a large amount of lending. By setting the upper limit for the amount of lending, for example, the amount of lending exceeding "1,000" cannot be made, or only a small amount of lending can be made for the amount of lending exceeding "1,000".

Therefore, a popular commodity can be spread to many people with a small amount of borrowing. Additionally, if the upper limit is set high enough, a bad influence is not given to the incentive that a commodity provider provides a good commodity. Furthermore, since the upper limit exists, the incentive to provide another good commodity is given without continuously supplying the commodity provider with unearned income. Additionally, because the upper limit is determined according to the labor or cost required for providing a commodity, which is self-declared, it is helpful to decrease the incentive to underestimate and declare the labor or cost.

Furthermore, the scale of a deal can be easily determined by limiting the value of lending of a commodity, according to the process for determining the scale of a deal. Specifically, a commodity provider cannot have the amount of lending from the first deal, or can have only a small amount of lending for a commodity requiring much labor or cost when provided.

The second determining unit 13 determines whether or not the labor or cost (self-declared by a commodity provider) required for providing a commodity exceeds an upper limit. If "YES", the second determining unit 13 determines that the scale of the deal is large. With this process, the deal of an untargeted commodity is eliminated.

The second determining unit 13 determines whether or not the labor or cost (self-declared by the commodity provider) for providing a commodity of a commodity provider in a predetermined period exceeds an upper limit. If "YES", the second determining unit 13 determines that the scale of the deal is large. This process prevents the situation in which the commodity provider deviates from his or her original duty, and engages with the deal.

Additionally, the second determining unit 13 raises the above described upper limit for a black-ink commodity provider (whose total values of lending is larger than the total of labor and cost required for providing a commodity), and lowering the upper limit for a red-ink commodity provider (whose total values of lending is smaller than the total of labor and cost required for providing a commodity). As a result, a member who often fails to deal a commodity will not be able to make deals frequently, while a member who frequently makes successful deals will be able to make a lot of deals. The labor and cost spent for providing a commodity are to be lost depending on the frequency of unsuccessful deals. Since the failure rate of a member who had a bad score in the past seems to be high, the risk can be made lower by lowering the upper limit of that member.

If a registration request of a commodity to be dealt is issued from a commodity provider, a commodity which must be performed via a top-down instruction channel is not to be handled by determining whether or not to permit the registration of the commodity by using the second determining unit 16.

As an example of this determination method, there is a method for unregistering a commodity whose labor or cost (self-declared by a commodity provider) required when being provided exceeds an upper limit.

When the labor or cost (self-declared by a commodity provider) required for providing a commodity of the commodity provider in a predetermined period exceeds an upper limit, commodities provided by that commodity provider are not registered any longer, with this determination method. This process prevents the commodity provider from deviating from his or her original duty, and engaging in the deal.

By preparing the modifying unit 17 equipped with the capability for retroactively modifying the data which is updated by the updating unit 15 and registered to the registering unit 11, the dealing of a commodity can be made even if the deciding unit 14 cannot decide whether to leave the values of lending and borrowing incurred by the deal of the commodity unchanged, to subtract a part or a whole of the values or to prohibit the deal of the commodity itself.

The values of lending and borrowing of a commodity are changed, for example, according to the number of commodity receivers using the setting unit 18. The data registered to the registering unit 11 is retroactively modified so that the values of lending and borrowing prior to the change will be values after the change by using the second modifying unit 19, when the values of lending and borrowing are changed.

For example, if the value of borrowing is smaller when a commodity is provided after many members receive the commodity, it is better to keep the commodity from being provided. It is more advantageous to keep the commodity from being provided, and receive it after the value of borrowing decreases. As a result, all members refrain from being provided with the commodity, and suffer a loss because the price of the commodity does not drop. With the above described process, however, when the price of the commodity drops as the number of commodity receivers increases, such a problem can be overcome by securing drawback to the commodity receivers even after they receive the commodity.

A commodity provider may sometimes suffer a loss because he or she does not estimate a suitable price and marks too high a price, and accordingly, the number of commodity receivers does not increase. Such a problem can be prevented from occurring by gradually lowering the price with the drawback condition attached, and fixing the final price when the sales do not increase, according to the above described process.

In and after a second deal of an identical commodity for an identical commodity receiver, the values of lending and borrowing of the commodity are set to "0" or a value close to "0" by using the second setting unit 20.

With this process, the value of a commodity which does not require a cost when being copied can be set to the values of lending and borrowing suitable for the labor to be provided. If the values of lending and borrowing of the commodity are not "0" at a second or subsequent time, a commodity receiver wastes the labor and resource for managing the initially provided information. However, the above described process can prevent this waste. Because it is sufficient for a commodity provider to manage information intensively, modification can be made with ease even if an error or a change occurs in the information.

Additionally, the setting of borrowing which enables the balance registered to the registering unit 11 to increase, is permitted by using the third setting unit 21 on the condition that security is given.

If the number of members who frequently borrow or the number of members who cannot repay their loans increases, the situation called inflation occurs in which the rate of the values of lending and borrowing goes down. The above described process can prevent excessive borrowing by demanding security, such as the provision of labor, if loans are not repaid. As a result, the rate of the values of lending and borrowing can be stabilized.

Furthermore, a deal which enables further borrowing will be prohibited by using the prohibiting unit 22, when the balance registered to the registering unit 11 reaches a stipulated negative value.

With this process, further borrowing is prohibited by setting an upper limit for the value of borrowing exceeding the amount which cancels the total of the values of borrowing and the total of the values of lending for each commodity receiver. As a result, excessive borrowing can be prevented by prohibiting further borrowing, thereby stabilizing the values of lending and borrowing.

Still further, a list of commodities to be provided is displayed while making a commodity provider anonymous by using the displaying unit 23.

This process enables a deal to be made with anonymity. Since the name of the partner is unknown, human relationships will not suffer even if it is erroneously determined that association has not occurred, despite the actual occurrence of the association. Furthermore, even if the deal of a commodity is unsuccessful, the bad reputation of the commodity provider can be prevented from having a bad influence on his or her original duty.

Still further, a list of commodities to be provided is displayed while assigning temporary names to commodity providers using the second displaying unit 24.

This process enables a deal to be made with anonymity. Therefore, even if it is erroneously determined that association has not occurred despite its actual occurrence, the name of the partner is unknown. As a result, human relationships will not suffer. Besides, the bad reputation of that member can be prevented from having a bad influence on his or her original duty even if a commodity deal is unsuccessful. Additionally, selfish behavior (such as fraud, provision of a deceitful commodity etc.), which can occur due to the admission of anonymity, can be prevented, and at the same time, an incentive to promote good behavior can be offered to a commodity provider.

Still further, the reputation data of a commodity is obtained from a commodity receiver by using the obtaining unit 25 and third displaying unit 26, and is displayed.

This process prevents a commodity provider from behaving selfishly (such as fraud, provision of a deceitful commodity, etc.). By being combined with the above described process, an anonymous member or a partner can be prevented from behaving a selfishly, and at the same time, an incentive to promote good behavior is offered to a commodity provider. In addition, it can eliminate the problem of a commodity receiver having to remember a brand name, i.e. the temporary name of the commodity provider.

Still further, when a member other than a commodity provider changes a commodity, the value of lending incurred due to the deal of that commodity is charged to both the commodity provider and the member by using the charging unit 27.

This process enables the incentive to change a commodity of another member to be provided to a commodity receiver. Since it is not disadvantageous for the original commodity provider, and rather, the amount of lending increases because a changed commodity is sold, the incentive to provide a commodity on which it is easy to make an improvement, can be offered to the commodity provider.

Still further, a manager cannot reference the data registered to the registering unit 11 by rejecting a reference request of that data, which is made by a member other than the one who is permitted to make a reference, by using the rejecting unit 28.

This process prevents a manager from using the values of lending and borrowing for the evaluation of his or her subordinate. As a result, the incentive to make an excessive deal of a commodity which has a bad influence on his or her original duty, can be eliminated.

If the values of lending and borrowing are used for the evaluation of an individual, the individual will further labor to improve the values of lending and borrowing, which are clearly reflected as numeric values, when his or her original duty is difficult to evaluate as a numeric value. Consequently, there is a possibility that a bad influence is given to management of an organization. In the meantime, if those values are not used for the evaluation of an individual, the individual must make an effort to get a high rating in the evaluation of his or her original duty so as to get a higher rating in the evaluation of an individual. Therefore, the original duty is not neglected. Since there is an advantage in a deal of a commodity only when an original duty is improved by providing a commodity, being provided with a commodity, and cancelling the values of lending and borrowing, there is no incentive to behave in a way which has a bad influence on an original duty.

Still further, when a commodity receiver issues a currency (including an electronic currency) to a commodity provider, the data registered to the registering unit 11 is changed according to the currency by using the changing unit 29.

This process enables a currency to be exchanged, thereby realizing a more practical implementation.

FIG. 2B is a schematic diagram showing the variation of the system shown in FIG. 2A.

The difference from the system shown in FIG. 2A is that the second determining unit determines the scale of a commodity to be dealt when a deal request is made, and/or when a registration request of commodity information is made.

As described above, the timing when the scale of a commodity to be dealt is determined is not limited to the timing when the deal request of the commodity is made. Note that the determination result of the scale of a commodity to be dealt may be temporarily stored in a memory, etc. (not shown in the drawings), and used for a subsequent deal of a commodity.

Figure 3:
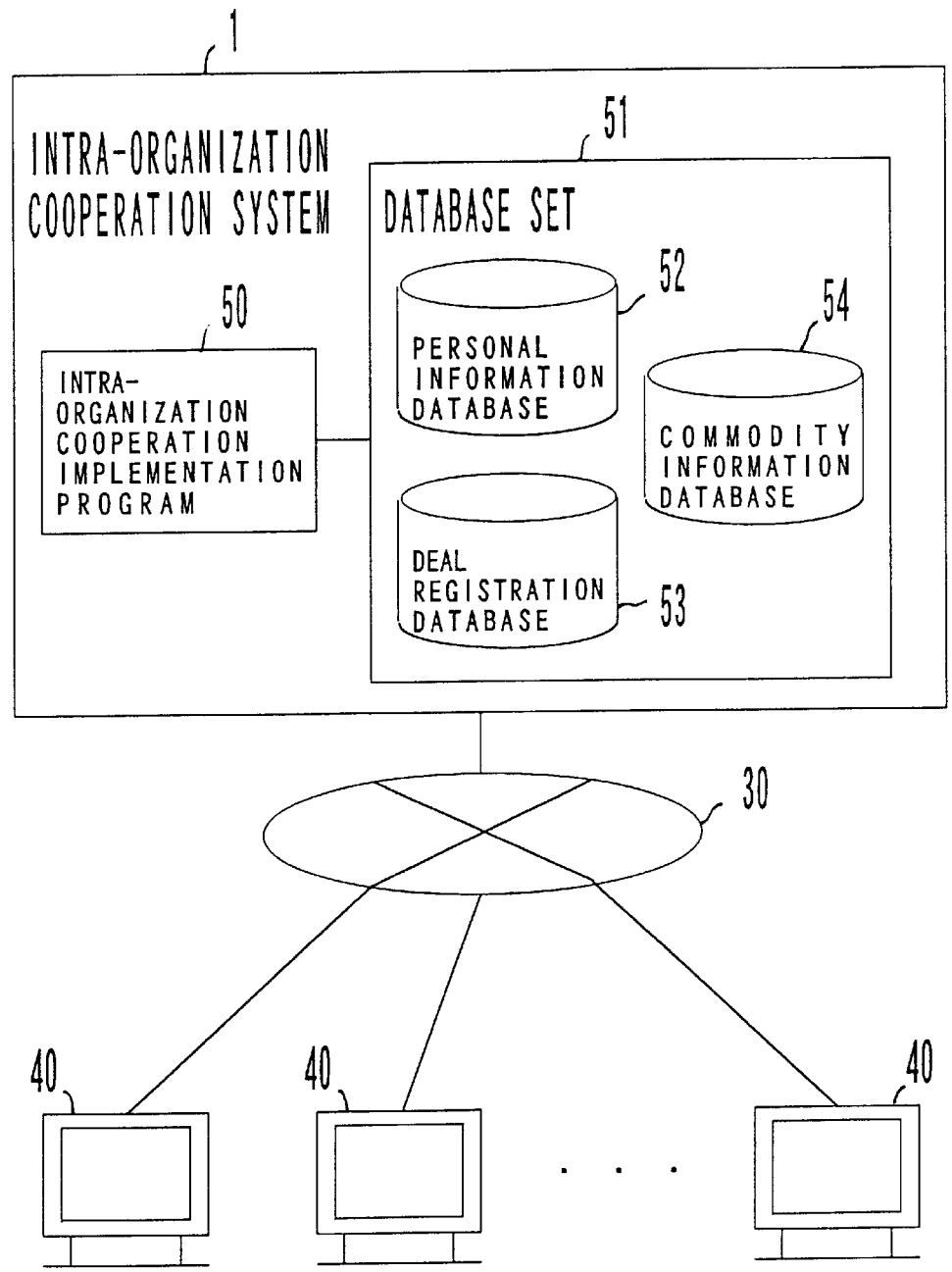
FIG. 3 is a schematic diagram showing an embodiment of the present invention.

FIG. 3 is a schematic diagram showing an embodiment of the present invention.

As shown in this figure, an intra-organization cooperation system 1, according to the present invention, is connected to a plurality of terminals 40 via a network 30, and realizes cooperation in an organization by electronically registering a deal of a commodity such as information, labor etc., (such as generation of a program etc.), which is lent or borrowed between members belonging to the organization, by using the plurality of terminals 40.

To realize the cooperation in the organization, the intra-organization cooperation system 1, according to the present invention, comprises an intra-organization cooperation implementation program 50, a database set 51 composed of a personal information database 52, a deal registration database 53 and a commodity information database 54.

Figure 4:
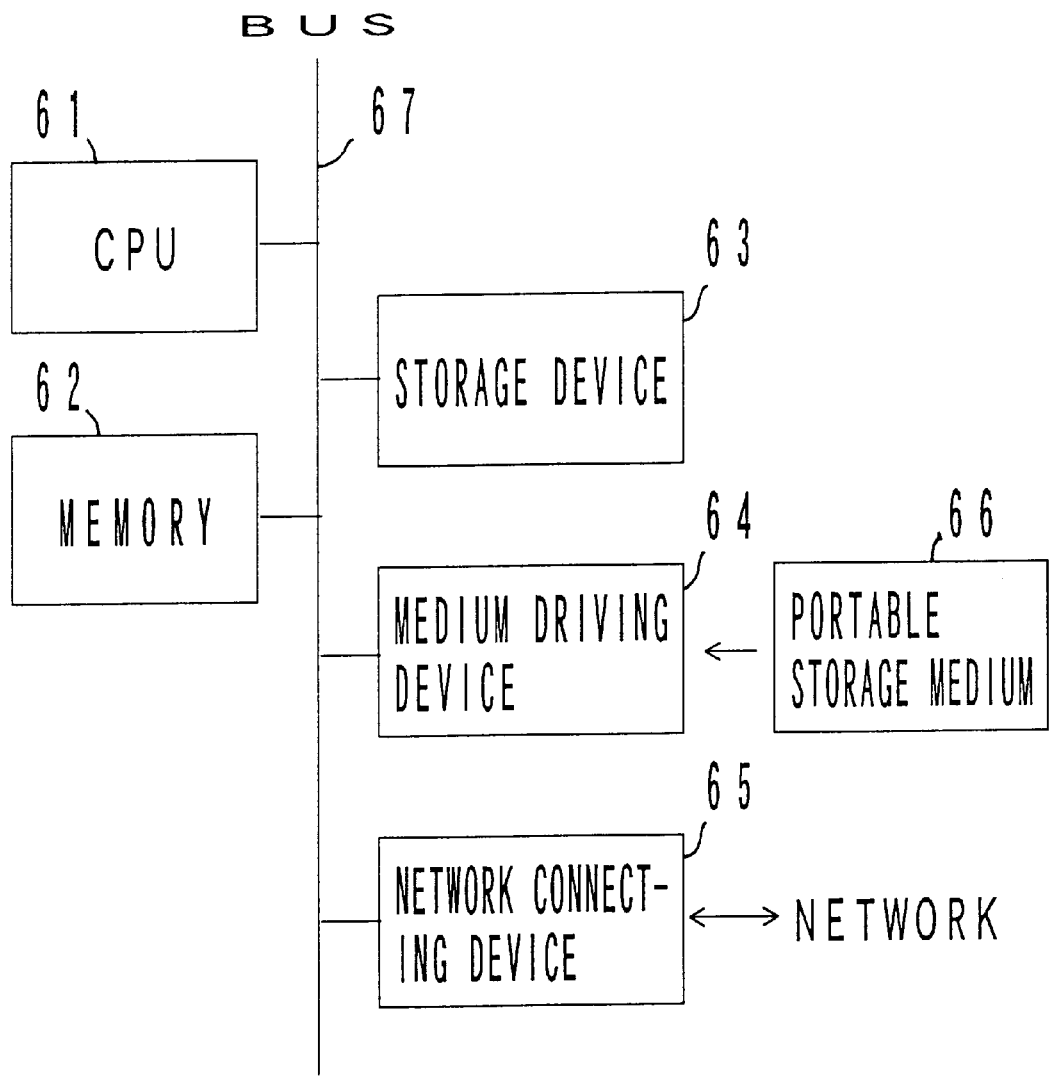
FIG. 4 is a schematic diagram showing the hardware configuration for implementing the intra-organization cooperation system.

FIG. 4 exemplifies the hardware configuration of the intra-organization cooperation system 1.

In this figure, the intra-organization cooperation system 1 comprises a CPU 61, a memory 62, a storage device 63, a medium driving device 64 and a network connecting device 65, which are interconnected by a bus 67.

The CPU 61 is a central processing unit for controlling the entire intra-organization cooperation system.

The memory 62 is a memory such as a RAM, etc. for temporarily storing a program or data stored in the storage device 63 (or in a portable storage medium 66) at the time of program execution or data updating etc.

The storage device 63 corresponds to the database set 51, shown in FIG. 3. It is, for example, an HDD. The storage device 63 may further store the intra-organization cooperation implementation program 50, shown in FIG. 3.

Otherwise, the intra-organization cooperation implementation program 50 may be stored in the portable storage medium 66. The intra-organization implementation program 50, stored in the portable storage medium 66 in this case, is read by the medium driving device 64. The CPU 61 executes the intra-organization cooperation implementation program 50, thereby implementing the intra-organization cooperation system according to the present invention.

The portable storage medium 66 is, for example, an FD (floppy disk), a CD-ROM, a DVD, a magneto-optical disk, etc.

Additionally, the intra-organization cooperation implementation program 50 may be one which is stored in a storage unit in an external device and distributed via a network (such as the network 30, shown in FIG. 3) to which the network connecting device 65 is connected.

FIG. 5 exemplifies the personal information database 52, shown in FIG. 3. This database manages names of members belonging to an organization, balances (obtained by subtracting the value of borrowing from the value of lending) of the members, names of a department and a section to which each of the members belongs, debts (which increases a balance) owed by the members, and security which enables the debts (labor etc., to be provided when a debt cannot be repaid within a limit), and set for example, by a member.

FIG. 6 exemplifies the deal registration database 53, shown in FIG. 3. This database manages names of commodities which were dealt, names of members who purchased the commodities, prices of the commodities (numeric values of lending, which are set by commodity providers), reputation values of the commodities (reputation values that commodity receivers set for the commodities), and dates of deals of the commodities.

FIG. 7 exemplifies the commodity information database 54, shown in FIG. 3. This database manages names of commodities to be provided to members, specifications of the commodities (information about what a program relates to etc.), names of providers of the commodities, prices of the commodities (numeric values of lending, which are set by commodity providers), times of labor required for providing the commodities (self-declared by the commodity providers), costs required for providing the commodities (which are self-declared by the commodity providers), brand names (which are arbitrarily set by the commodity providers, on the condition that they are unique) of the commodity providers, names (hereinafter referred to as essential commodity names) of original commodities from which the commodities were changed, if any change is made to the commodities) and registration dates of the commodities. Each of the prices of the commodities can be arbitrarily set by a commodity provider, for example, on the basis of labor (the amount of labor time) required for providing the commodity. Note that, however, in a case such as the sale of a commodity becoming slow if a price which is too high compared with the original price of the commodity is set, the marketing theory is applied. Therefore, the actual price is decided/changed in consideration of the balance between supply and demand.

A substantial commodity is managed by the intra-organization cooperation system 1, according to the present invention, in response to a registration request made by a terminal 40, and is provided from the intra-organization cooperation system 1, according to the present invention, to another terminal 40 in response to a deal request made by the terminal 40. Otherwise, the commodity may be managed and provided by each terminal 40, and provided from a managing terminal 40 to a deal requesting terminal 40. In both of the above described cases, the intra-organization cooperation system 1 implements cooperation of an organization by electronically registering a commodity deal.

If there is a commodity yet to be put into an electronic form, a system administrator sends it to a deal requesting source by mail, or an administrator of a managing terminal 40 sends it to the system administrator by mail. Then, the system administrator forwards it to a deal requesting source upon receipt of the commodity.

Figure 8A:
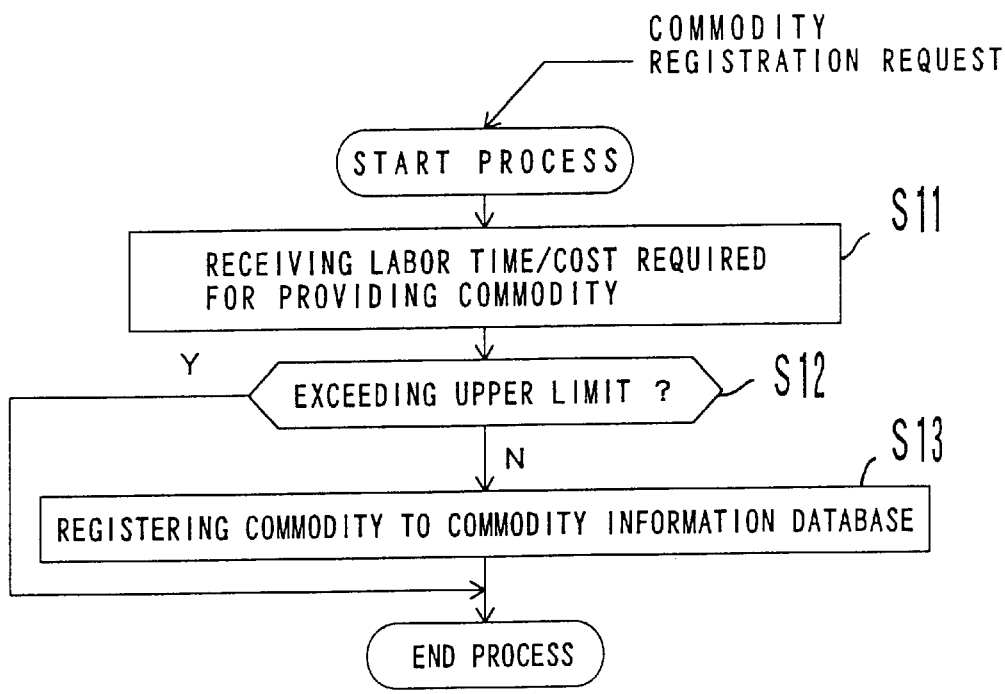
FIGS. 8A and 8B are flowcharts showing processes for performing an intra-organization cooperation implementation program.
Figure 8B:
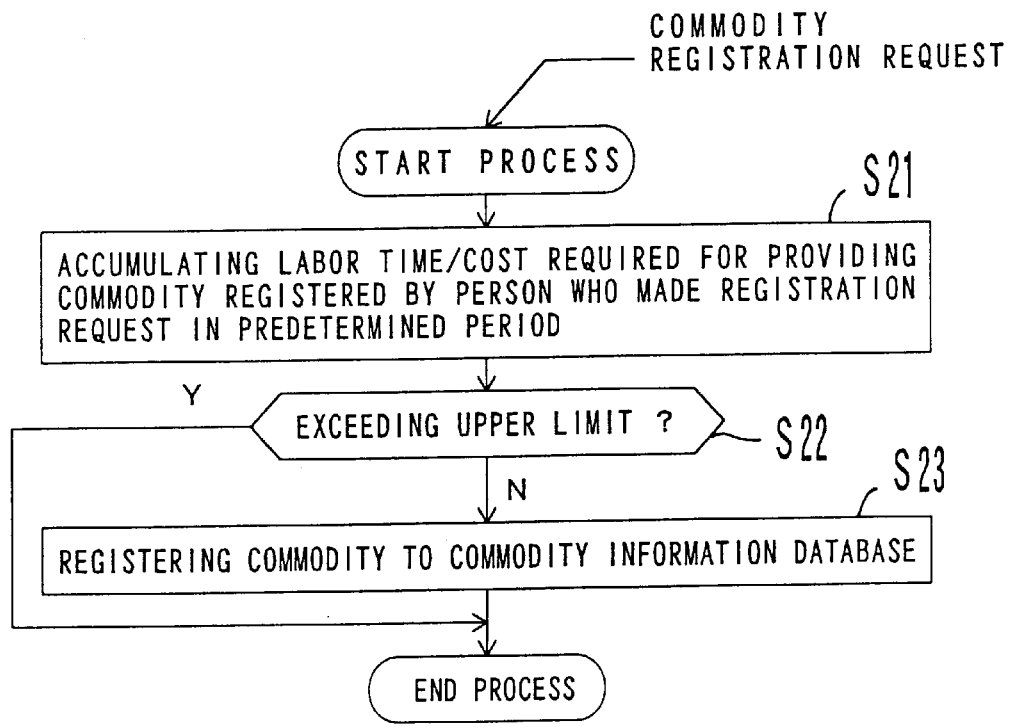

FIGS. 8A, 8B and 9 are flowcharts showing an implementation of fundamental process performed by the intra-organization cooperation implementation program 50. Provided next are the explanations about the fundamental processes performed by the intra-organization cooperation implementation program 50, by referring to these flowcharts.

If a request to register his or her commodity as a commodity handled by the present invention is issued from a commodity provider via a terminal 40, the intra-organization cooperation implementation program 50 first receives the values of the labor and cost required for providing the commodity from the commodity provider in step S11, as shown in the process flow of FIG. 8A.

Then, in step S12 the intra-organization cooperation implementation program 50 uses either or both of the values of the received labor and cost as a determination target, and determines whether or not the value to be determined exceeds a predetermined upper limit. If "NO", the intra-organization cooperation implementation program 50 receives the commodity information to be successively input (such as the name, specification, price, brand name, essential commodity name, and the registration date of the commodity and the name of the provider, which are to be registered to the commodity information database 54), and registers the commodity to which the registration request is issued by registering the values of the labor and cost input in step S11 together with the received commodity information (step S13).

If the intra-organization cooperation implementation program 50 determines that the value to be determined exceeds the upper limit, it does not register the commodity to which the registration request is issued, by ignoring the commodity information to be successively input.

As described above, the intra-organization cooperation implementation program 50 determines that a commodity which requires a considerable amount of labor time or a high cost when being provided, is a transaction which must be processed via a top-down instruction channel, and does not register that commodity as a commodity handled by the present system.

If a request to make registration as a commodity, handled by the present invention, is issued from a commodity provider via a terminal 40, the intra-organization cooperation implementation program 50 first accumulates the amounts of labor time/costs required for providing the commodity registered by the commodity provider who issued the registration request in a predetermined period in step S21, as shown in the process flow of FIG. 8B. Specifically, this accumulation process is performed by referencing the commodity information database 54, searching for the labor time/cost required for providing the commodity registered by the commodity provider who issued the registration request in a predetermined period ending with a registration request date, and accumulating the amounts of labor time/costs.

Next, the intra-organization cooperation implementation program 50 recognizes either or both of the accumulated values as a determination target, and determines whether or not the value to be determined exceeds a predetermined upper limit in step S22. If "NO", the intra-organization cooperation implementation program 50 registers the commodity to which the registration request was issued by receiving the commodity information to be successively input (such as the name, specification, price, labor time, cost, brand name, essential commodity name, and registration date of the commodity and the name of the provider, which are to be registered to the commodity information database 54), and registers these items of information in the commodity information database 54.

If the intra-organization cooperation implementation program 50 determines that the value to be determined exceeds the upper limit, it does not register the commodity to which the registration request was issued, by ignoring the commodity information to be successively input.

As described above, the intra-organization cooperation implementation program 50 eliminates the behavior which strikingly deviates from an original duty and provides a commodity, handled by the present invention, thereby preventing the original duty from being impeded.

The intra-organization cooperation implementation program 50 calculates the total of the prices (equivalent to the sales) of commodities sold by commodity providers who issued a registration request in a predetermined period by referencing the deal registration database 53, and calculates the total amounts of labor time/costs (equivalent to the cost price) required for providing the commodities, by referencing the commodity information database 54. It is desirable that the intra-organization cooperation implementation program 50 raises the upper limit if the result obtained by subtracting the latter total from the former total is a positive value, that is, it indicates a black-ink; and lowers the upper limit if the result is a negative value, that is, it indicates a red-ink. With this configuration, also a commodity which requires a considerable amount of labor time and a high cost is permitted to be registered for a person who makes a successful deal, while only a commodity which requires a small amount of labor time and a low cost is permitted to be registered for a person who makes an unsuccessful deal.

If a commodity, handled by the present invention, is registered to the commodity information database 54 in this way, the intra-organization cooperation implementation program 50 displays a list of commodities to be dealt on a screen of a terminal 40 in response to a request issued from a commodity receiver who attempts to make a deal of the commodity.

FIGS. 9A, 9B, and 9C respectively exemplifies a commodity list screen to be displayed at this time.

The commodity list screen shown in FIG. 9A obtains the names, specifications and prices of commodities which can be dealt from the commodity information database 54, and displays these items of information. This commodity list screen makes commodity providers anonymous so as not to worsen human relationships within an organization.

The commodity list screen shown in FIG. 9B obtains the names, specifications and prices of commodities which can be dealt, and the brand names of providers of the commodities from the commodity information database 54, and displays these items of information. This commodity list screen displays the brand names of commodity providers so as not to worsen human relationships, and to display the quality of the commodities.

The commodity list screen shown in FIG. 9C obtains the names, specifications, prices of commodities which can be dealt and the brand names of the providers of the commodities from the commodity information database 54, obtains a reputation value (an average value, if a plurality of reputation values are registered) of the commodities, and displays the value. Since the reputation value of the commodity providers can be obtained by referencing the deal registration database 53 and the commodity information database 54, it is possible to display the reputation value in addition to the above described commodity information. This commodity list screen can accurately display the quality of a commodity, regardless of brand name, by displaying the reputation value of the commodities. Note that the brand name may not necessarily be displayed.

Figure 10A:
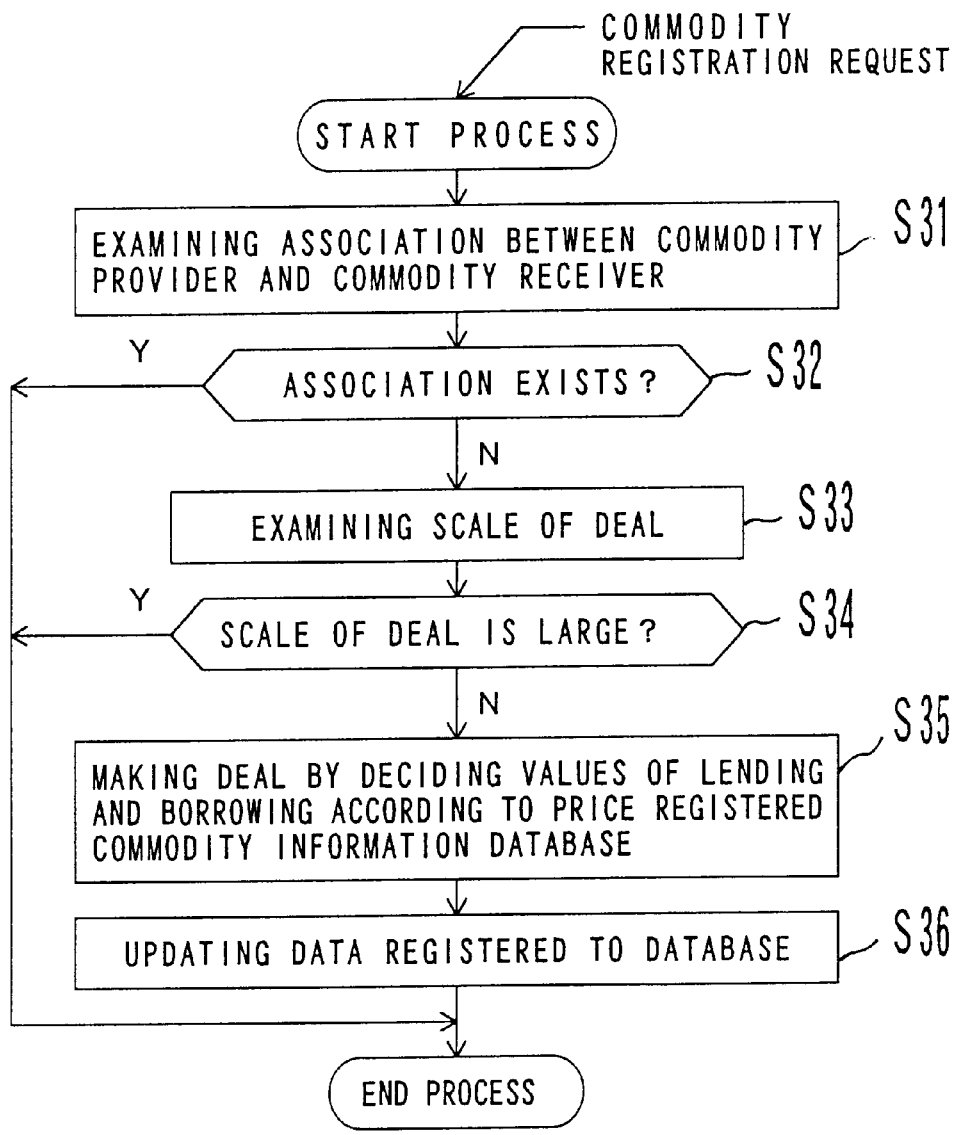
FIGS. 10A and 10B are flowcharts showing processes for performing an intra-organization cooperation implementation program.
Figure 10B:
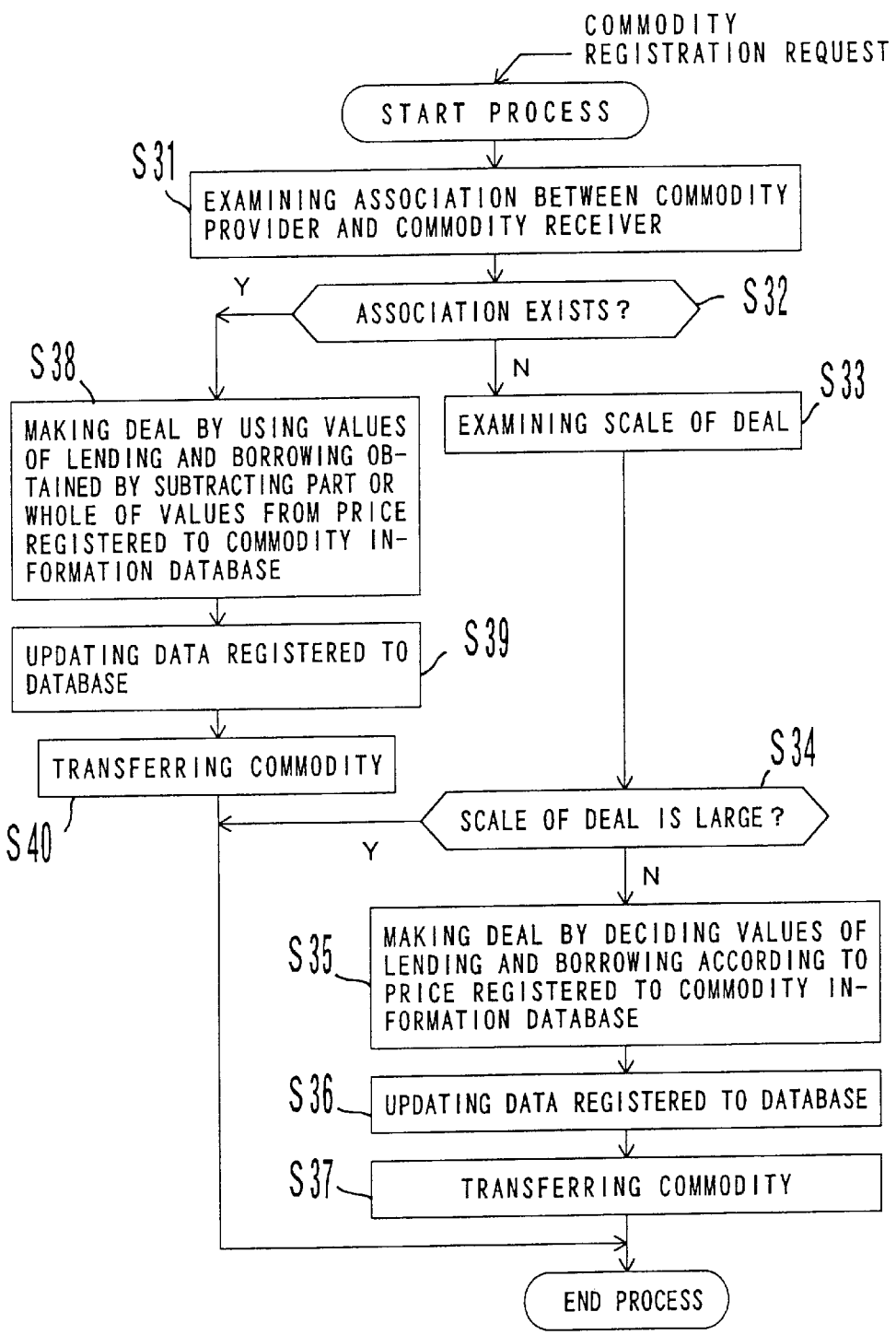

FIGS. 10A and 10B are flowcharts 1 and 2 showing processes performed by the intra-organization cooperation implementation program 50.

If any of the commodity list screens, shown in FIGS. 9A through 9C, is displayed, a commodity receiver who attempts to make a deal of a commodity inputs the name of his or her desired commodity via a terminal 40. Upon receipt of the input name, the intra-organization cooperation implementation program 50 first examines whether or not the probability of occurrence of association between a commodity receiver and a provider of the commodity that the commodity receiver desires, is high in step S31, as shown in the process flow of FIG. 10A.

This determination process performed in step S31 first identifies the provider of the commodity having the input name by referencing the commodity information database 54. Then, the process searches for the names of departments/sections to which the identified commodity provider and the commodity receiver belong by referencing the personal information database 52. If the searched names are in an identical section in an identical department, the process determines that the probability of occurrence of association between the commodity provider and the commodity receiver is high. Otherwise, the process determines that the probability of occurrence of association between the commodity provider and the commodity receiver is low.

Or, the above described determination process performed in step S31 obtains the number of deals and their costs between a commodity provider and a commodity receiver in a predetermined period ending with a deal request date. If they are equal to, or larger than, a considerable number and amount, the process determines that the probability of occurrence of association between the commodity provider and the commodity receiver is high. Otherwise, the process determines that the probability is low. At this time, the process may obtain the number of deals and their cost between the departments/sections to which the commodity provider and the commodity receiver belong. If they are equal to, or larger than, a considerable number and amount, the process may determine that the probability of occurrence of association between the commodity provider and the commodity receiver is high. Otherwise, the process may determine that the probability is low.

After the determination process determines whether or not the probability of occurrence of association between a commodity provider and a commodity receiver is high in step S31 as described above, the process then determines whether or not the probability of the occurrence of association is determined to be high in step S32. If the probability of occurrence of association is not determined to be high in step S32, the process goes to step S33 in which the scale of the deal is determined.

The determination process performed in step S33 identifies the labor time and cost required for providing a commodity to be dealt by referencing the commodity information database 54, and sets the upper limit of the commodity by calculating a constant multiple of the time and cost. Next, the process obtains the total (equivalent to the sales) of the values of lending of the commodity by referencing the deal registration database 53. If the total exceeds the set upper limit, the process determines that the scale of the deal is large.

Additionally, the process identifies the labor time and cost required for providing a commodity to be dealt by referencing the commodity information database 54, and sets the upper limit of the commodity by calculating a constant multiple of the time and cost. If the value (price) of lending of the commodity, to which a deal request is made, exceeds the upper limit, the process determines that the scale of the deal is large.

Or, the process performed in step S33 identifies the labor time and cost required for providing a commodity to be dealt by referencing the commodity information database 54. If they are larger than predetermined upper limits, the process determines that the scale of the deal of the commodity to be dealt is large. Furthermore, the process identifies the commodity provider's labor time and cost required for providing commodities in a predetermined period by referencing the commodity information database 54. If it exceeds the upper limit, the process determines that the scale of the commodity to be dealt is large. It is desirable that the process raises the upper limit if the commodity provider makes a profit, and the process lowers the upper limit if the commodity provider suffers a loss, that is, he or she is red-ink.

After the process determines whether or not the scale of a deal is large in step S33, the process then determines whether or not the scale of the deal is determined to be large. If the scale of the deal is not determined to be large in step S34, the process goes to step S35 where the deal of the commodity is made after the values of lending and borrowing are decided according to the price registered to the commodity information database 54. That is, the deal is made in such a way that the value of lending of the commodity provider increases by the amount of cost due to his or her provision of the commodity to the commodity receiver, and the value of borrowing of the commodity receiver increases by the amount of cost due to his or her reception of the commodity from the commodity provision process.

In step S36, the process updates the balance of the personal information database 52 according to the deal made in step S35, and registers this deal to the deal registration database 53. When the reputation value of the dealt commodity is informed by the commodity receiver as a result of the deal, the process registers this value in the deal registration database 53.

In the meantime, the deal of the commodity is made by setting the values of lending and borrowing to "0" if the probability of occurrence of association between the commodity receiver and the commodity provider is determined to be high in step S32, and if the scale of the deal is determined to be large in step S34. That is, the deal is made in such a way that the value of lending of the commodity provider does not increase even if he or she provides the commodity receiver with the commodity, and also the value of borrowing of the commodity receiver does not increase even if he or she is provided with the commodity from the commodity provider. It means that the deal is not substantially made. Actually, the process is terminated without updating the balance of the personal information database 52, and registering the deal to the deal registration database 53.

Figure 11:
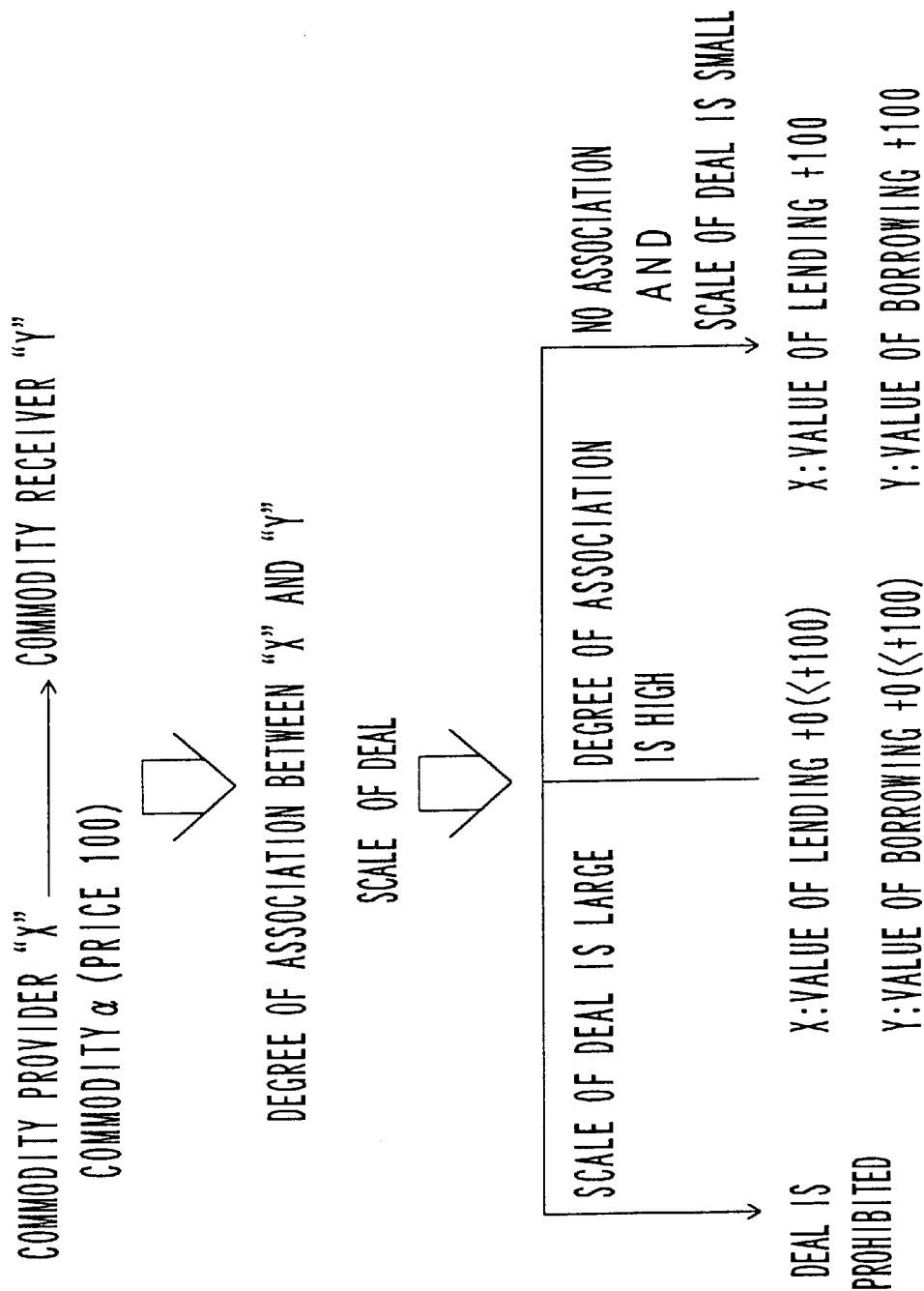
FIG. 11 is a schematic diagram showing a process of the present invention.

As described above, the intra-organization cooperation implementation program 50 examines the degree of association between a commodity provider "X" and a commodity receiver "Y", and the scale of a deal if the commodity receiver "Y" issues a deal request of a commodity α (for example, a commodity priced at "100"), which is provided by the commodity provider "X", as shown in FIG. 11. If the probability of occurrence of association between the commodity provider "X" and the commodity receiver "Y", and at the same time the scale of the deal is small, the process increases the balance of the commodity provider "X" registered to the personal information database 52 by increasing the value of lending of the commodity provider "X" by the price "100", and decreases the balance of the commodity receiver "Y" registered to the personal information database 52 by increasing the value of borrowing of the commodity receiver "Y" by the price "100" of the commodity α. If the probability of occurrence of association between the commodity provider and the commodity receiver is high, the process does not register the values of lending and borrowing even if a commodity deal is made. If the scale of a deal is large, the process prohibits the deal itself.

As described above, the intra-organization cooperation implementation program 50 applies the same operation as that of the marketing economy which is daily performed outside an organization by making registration of the values of lending and borrowing, which has almost the same effect as that of a currency exchange, when transaction cooperation is made between members in an organization.

If the probability of occurrence of association is high in an organization such as one department/section, the values of lending and borrowing are not registered (when the values are "0") even if transaction cooperation is made. Accordingly, human relationships will not deteriorate in such a department/a section. For relatively large-scale transaction cooperation, a loss caused by an unsuccessful deal is large, or there is no time to engage in an original duty assigned by a manager. Or, it must be coped with by changing an organization, or using the BPR. Since a deal of such large-scale transaction cooperation is prohibited, the above described problem will not occur.

According to the process flow shown in FIG. 10A, the values of lending and borrowing are not registered by setting the values to "0" if the probability of occurrence of association between a commodity provider and a commodity receiver is high. However, the values of lending and borrowing may be decreased and registered. Assuming that the price of a commodity is "100", the values of lending and borrowing may be decreased to "20" and registered if the probability of occurrence of association between a commodity provider and a commodity receiver is high, and if the scale of a deal is larger to some extent (not shown in the drawings)

Furthermore, the intra-organization cooperation implementation program 50 may perform its process, as shown in FIG. 10B.

Since the process performed in steps S31 through S36 of FIG. 10 is similar to that explained by referring to FIG. 10A, the same step numbers are denoted and the explanation is omitted.

After the database is updated in step S36, the process goes to step S37 where a commodity is transferred. That is, the commodity is transferred to the commodity receiver.

In step S32, if the process determines that the probability of occurrence of association between the commodity provider and the commodity receiver is high in step S32 ("YES" in step S32), the process goes to step S38 where the value, obtained by subtracting a part or a whole of values from the price of the corresponding commodity registered to the commodity information database 54, is recognized as the values of lending and borrowing incurred by the deal of the commodity. Then, that deal is made.

In step S39, the process updates the balance of the personal information database based on the deal made in step S38, and registers the result of the deal to the deal registration database 53. The process then goes to step S40 where it performs the process for transferring the commodity, and terminates the process.

Although not shown in the diagrams, the above described condition, where the process proceeds to step S38, may be one where the probability of occurrence of association between a commodity provider and a commodity receiver is determined to be high, or one where the scale of a deal is large to some extent. Here, the condition that "the scale of a deal is large to some extent" means that the scale of a deal is smaller than that recognized as a determination standard in step S34. For example, a deal on a mid-scale or larger.

Furthermore, the variation of the intra-organization cooperation implementation program 50 is not limited to the process flow shown in FIG. 10B. The intra-organization cooperation implementation program 50 may be the process in which the operations performed in steps S33 and S34 of FIG. 10B are advanced prior to step S31 although this is not shown in the drawings here. That is, once the process is started, the operations in steps S33 and S34 are first performed. If the result of the determination is "YES" in step S34, the process is terminated. If the result of the determination is "NO" in step S34, the process goes to step S31. If the result of the determination is "NO" in step S32 in this case, the process goes to step S35 (or goes to step S33 as occasion demands).

The difference between the above described process and the process shown in FIG. 10B is whether or not the operations in steps S38, 39, and 40 are performed if the results of the determinations in steps S32 and 34 are "YES".

In the above described process flow, it is determined whether or not the probability of occurrence of association between a commodity provider and a commodity receiver is high. However, this determination is sometimes difficult to make because of the structure of an organization.

In such a case, it is temporarily determined that the probability of occurrence of association between a commodity provider and a commodity receiver is low, this temporary determination is registered to the deal registration database 53, and the balance of the commodity provider and the commodity receiver, registered to the personal information database 52, is updated according to the above described method. If it is determined that the probability of occurrence of association between the commodity provider and the commodity receiver is high after the deal, the process identifies the price of the commodity handled in the temporary determination, and updates the balance of the commodity provider and the commodity receiver registered to the personal information database 52.

Additionally, in the process flow shown in FIG. 10, the deal of a commodity is made by setting the values of lending and borrowing to "0" if the probability of occurrence of association between a commodity receiver and a commodity provider is determined to be high, and/or if the scale of the deal is determined to be large. However, the deal of the commodity itself may not be permitted.

FIG. 12 is a flowchart showing another implementation of the process flow performed by the intra-organization cooperation implementation program 50. This process flow is performed when a price is not a constant, but, for example, the following one which varies depending on the number of commodity receivers.

price=MIN (50, 500/number of commodity receivers)

According to the process flow shown in FIG. 12, the intra-organization cooperation implementation program 50 first determines whether or not the price of a commodity to be dealt varies depending on the number of commodity receivers by referencing the commodity information database 54 in step S41. If "NO" in step S41, the process goes to step S46 where the current deal is made with the above described method.

If the price is determined to vary depending on the number of receivers ("YES" in step S41), the process goes to step S42 where it determines whether or not the current price is changed from the previous price. Assume that the price is set as follows.

price=MIN (50, 500/number of commodity receivers)

The price when the number of commodity receivers is up to 10 will be 50. The price when the number of commodity receivers is 11 or more will be "500/number of receivers". Therefore, whether or not the current price is changed from the previous price is decided by determining whether or not the number of members is 11 or more.

If the current price is not determined to change from the previous price ("NO" in step S42), the process goes to step S46 where the current deal is made using the same price as that of the previous deal. If the current price is determined to change from the previous price ("YES" in step S42), the process goes to step S43 where the current price is calculated. In step S44, the current deal is made using the calculated price. In step S45, the process identifies the deal of the commodity which was previously made by referencing the deal registration database 53, calculates the difference between the price of the identified deal and that of the current deal, and changes the balance registered to the personal information database 52 to the balance using the current price according to the calculated difference.

Assume that the price is set as follows:

price=MIN (50, 500/number of commodity receivers)

The price for the eleventh member will be "500/11". This price is also applied to the previous ten commodity receivers who purchased the commodity at a price of "50", and the amount of reduction of the price "50/11" will be repaid to the ten commodity receivers.

According to this process flow as described above, the effect that a member who purchased a commodity orally advertises the commodity with the anticipation of a reduction in price, can be expected.

Figure 13A:
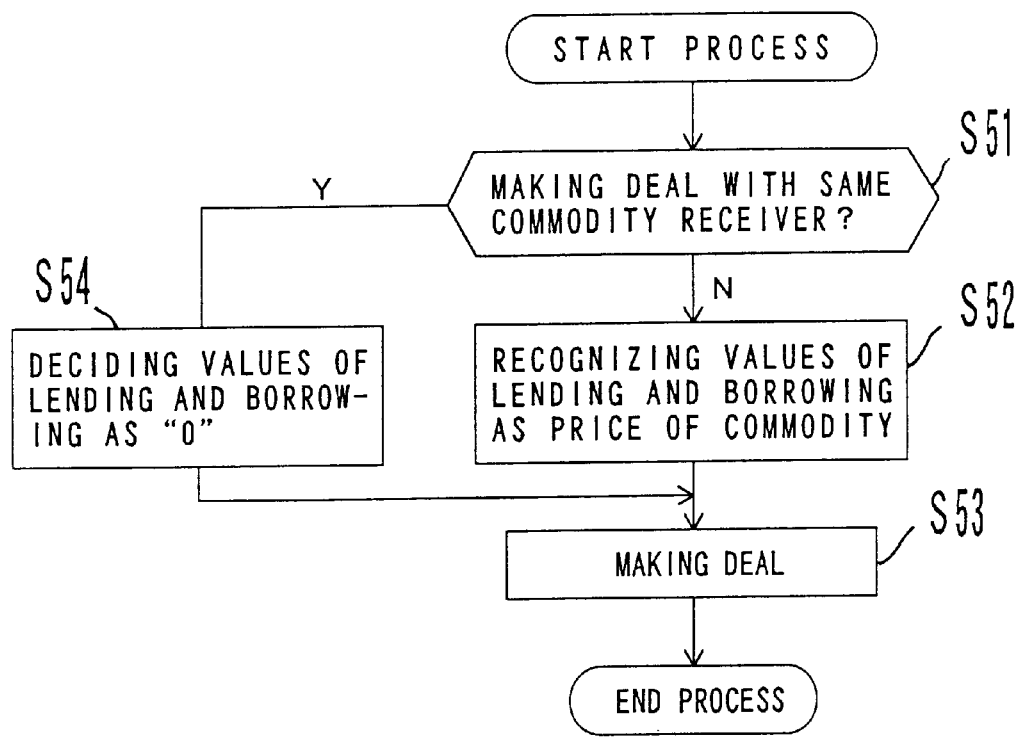
FIGS. 13A and 13B are flowcharts showing a process for executing an intra-organization cooperation implementation program.
Figure 13B:
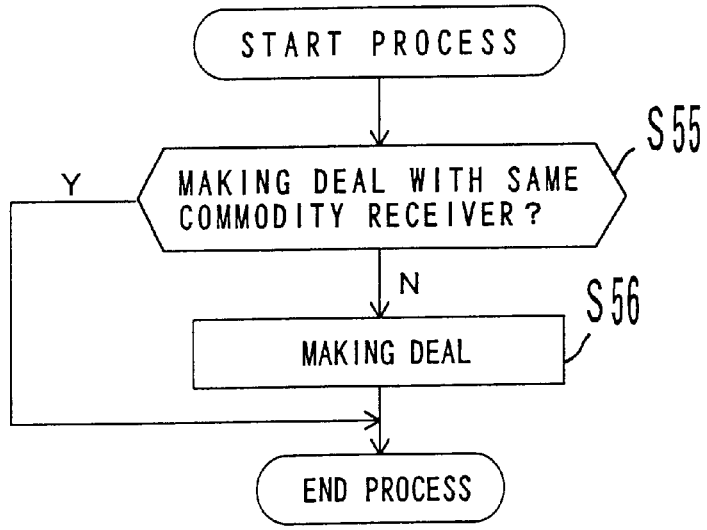

FIGS. 13A and 13B are flowcharts showing further implementations of the process flow performed by the intra-organization cooperation implementation program 50. These process flows are performed when an identical commodity is provided to an identical commodity receiver.

If the process flows shown in FIGS. 13A and 13B are applied, the intra-organization cooperation implementation program 50 first determines whether or not a commodity to be dealt was previously dealt by the same commodity receiver by referencing the deal registration database 53, in step S51. If the intra-organization cooperation implementation program 50 does not determine that the commodity was previously dealt ("NO" in step S51), the process makes a deal (in step S53) based on the price registered to the commodity information database 54 (in step S52).

If the intra-organization cooperation implementation program 50 determines that the commodity to be dealt was previously dealt by the same commodity receiver ("YES" in step S51), the process sets the values of lending and borrowing to "0" in step S54, and makes the deal of the commodity in step S53. That is, the deal is made in such a way that the value of lending of the commodity provider does not increase even if he or she provides the commodity receiver with the commodity, and the value of the borrowing of the commodity receiver does not increase even if he or she is provided with the commodity from the commodity provider. Accordingly, it means that the deal is not substantially made if the deal is determined to be made with the same commodity receiver as shown in FIG. 13B, step S55. Actually, the intra-organization cooperation implementation program 50 does not update the balance of the personal information database 52, nor register the deal to the deal registration database 53, and terminates the process. If the deal is not made with the same commodity receiver ("NO" in step S55), the deal is made by updating the contents of each of the databases 52 and 53, in step S56.

According to this process flow as described above, a commodity which requires no cost when being copied can be provided at an appropriate price.

Figure 14:
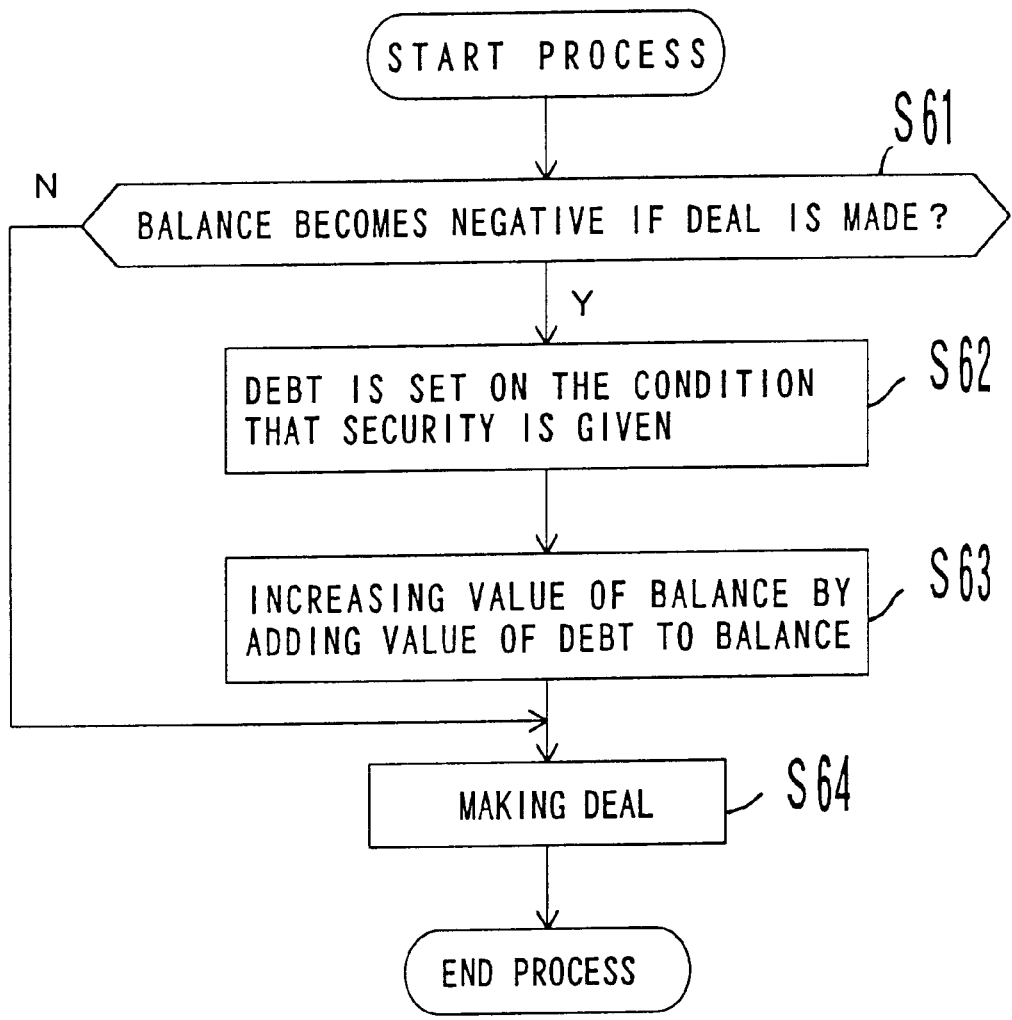
FIG. 14 is a flowchart showing a process for executing an intra-organization cooperation implementation program.

FIG. 14 is a flowchart showing another implementation of the process flow performed by the intra-organization cooperation implementation program 50. This process flow is performed when a debt, under the condition that security is given, is included in the personal information database 52.

According to the process flow shown in FIG. 14, the intra-organization cooperation implementation program 50 first determines whether or not the balance of a commodity receiver becomes a negative value if a deal is made, in step S61. If "NO", the process goes to step S64 where the deal is made.

If "YES" in step S61, the process goes to step S62 where the commodity receiver is permitted to borrow on the condition that security is given, and the debt is set.

In step S63, the set debt is added to the balance of the commodity receiver, and the balance increases. In step S64, the deal is made because it is guaranteed that the balance will not become a negative value due to its increase.

Additionally, if the commodity receiver becomes a commodity provider and obtains the value of lending when the debt is set, the value is appropriated for repaying the debt. Therefore, the balance of the commodity receiver may not be increased until the repayment of the debt is completed. Furthermore, if the debt cannot be repaid although it passes a stipulated repayment limit, labor etc., will be provided in accordance with the security setting. Still further, a balance which is a negative value may be permitted, and a debt may be recognized to incur when the balance is a negative value.

According to this process flow as described above, a debt is permitted on the condition that security is given, thereby preventing excessive borrowing and stabilizing the values of lending and borrowing.

Figure 15:
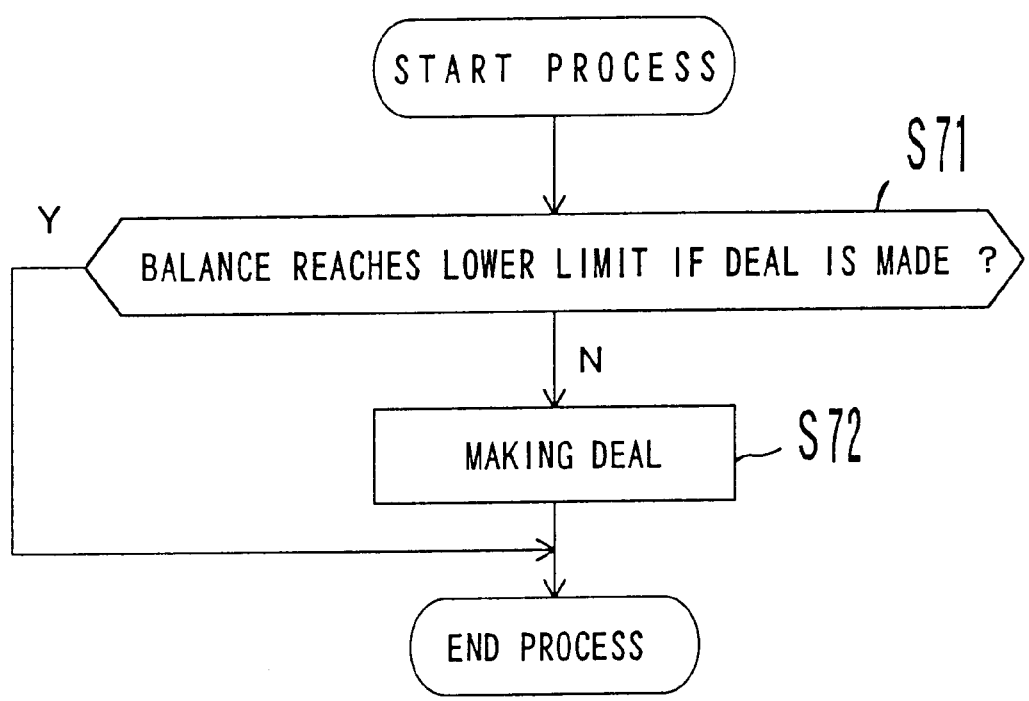
FIG. 15 is a flowchart showing a process for executing an intra-organization cooperation implementation program.

FIG. 15 is a flowchart showing another implementation of the process flow performed by the intra-organization cooperation implementation program 50. This process flow is performed on the condition that a balance which is negative and equal to or lower than a lower limit is not permitted.

Once the intra-organization cooperation implementation program 50 begins to make a deal according to the process flow, shown in FIG. 15, it first determines whether or not the balance of a commodity receiver reaches a stipulated lower limit which is a negative value when the deal is made, in step S71. If the balance is not determined to reach the lower limit ("NO" in step S71), the process goes to step S72 where the deal is made. If the balance is determined to reach the lower limit ("YES" in step S72), the process is terminated without making a deal. Note that the lower limit can be a value which differs depending on a commodity receiver.

According to this process flow as described above, a further borrowing is prohibited when the balance reaches a stipulated negative lower limit. As a result, excessive borrowing can be prevented, and the values of lending and borrowing can be stabilized.

Figure 16A:
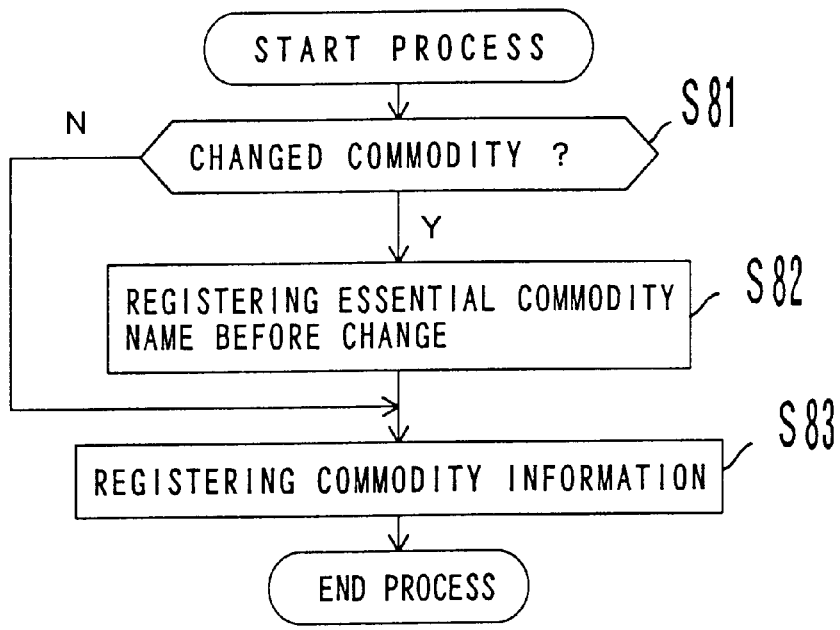
FIGS. 16A and 16B are flowcharts showing processes for executing an intra-organization cooperation implementation program.
Figure 16B:
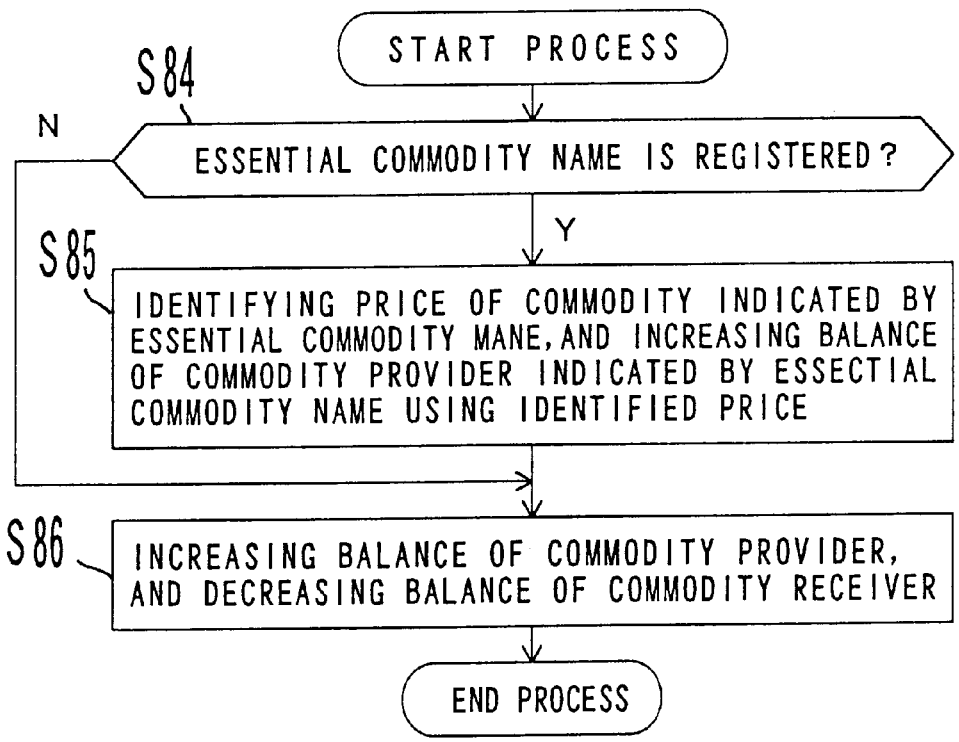

FIGS. 16A and 16B are flowcharts showing other implementations of the process flow performed by the intra-organization cooperation implementation program 50. This process flow is performed when a commodity is changed by a person different from a commodity provider.

The process flow shown in FIG. 16A is, for example, a process when a generated commodity is registered to the commodity information database 54, according to the process flows of FIGS. 8A and 8B. First of all, the intra-organization cooperation implementation program 50 determines whether or not a commodity to be registered is a changed commodity, in step S81. If the commodity is not determined to be a changed commodity ("NO" in step S81), that is, if it is determined to be a commodity which is first generated by a commodity provider, the process goes to step S83 where the generated commodity is registered to the commodity information database 54 by registering the information such as the name, specification, price, labor time, cost, brand name and registration date of the commodity and the name of the provider, to the commodity information database 54.

If the commodity to be registered is determined to be a changed commodity ("YES" in step S81), that is, if it is determined to be a commodity which is changed by a person other than a commodity provider, the process goes to step S82 where the name of the original commodity is registered as an essential commodity name. Then, the process goes to step S83 where the changed commodity is registered to the commodity information database 54 by registering the name, specification, price, labor time, cost, brand name and registration date of the commodity, and the name of the provider, to the commodity information database 54.

The intra-organization cooperation implementation program 50 performs a process shown in FIG. 16B when updating the balance of the commodity provider and the commodity receiver for a deal of a registered commodity, which is made according to the above described method. That is, the process first determines whether or not a dealt commodity has an essential commodity name by referencing the commodity information database 54. If the commodity is not determined to have the essential commodity name ("NO" in step S84), that is, if the commodity is not determined to be a changed one, the process goes to step S86 where the balance of a commodity provider is increased by increasing his or her lending based on the price of the commodity, and the balance of the commodity receiver is decreased by increasing his or her borrowing.

If the dealt commodity is determined to have the essential commodity name ("YES" in step S84), that is, if it is determined to be a changed commodity, the process goes to step S85 where the price of the commodity indicated by the essential commodity name is identified by referencing the commodity information database 54, and the balance of the provider of the commodity, indicated by the essential commodity name, is increased by increasing his or her lending. The process then goes to step S86 where the lending of the commodity provider (the person who changed the commodity) is increased by increasing his or her lending. At the same time, the balance of the commodity receiver is decreased by increasing the borrowing of the commodity receiver according to the price assigned to the provider of the changed commodity, and the price assigned to the provider who generated the original commodity Assuming that a commodity β is generated by changing a commodity α, the value of lending "200" is provided to the commodity provider who generated the commodity α, and the value of lending "100" is provided to the commodity provider who changed the commodity β. Furthermore, the value of borrowing "300" is registered to a commodity receiver who deals the commodity β. Note that a price increase due to a change of a commodity is determined by making a self-declaration by the person who changes the commodity. The price is set to be high or low according to the [value of the change. The essential commodity may sometimes be plural, or a commodity having an essential commodity name (changed commodity) itself may be an essential commodity of another commodity.

The value of lending incurred due to a commodity deal is allotted not only when an original commodity is changed, but also when the original commodity is used as a part, and commodity supplementary information which is the information or service to supplement the original commodity and must be provided together with the original commodity, is used.

According to this process flow as described above, a person who changes a commodity generated by another person is given an advantage at the time of the change. Also a commodity provider who provides the original commodity is given an advantage.

FIG. 17 is a flowchart showing another implementation of the process flow performed by the intra-organization cooperation implementation program 50. This process flow is performed when a reference request of the database 51 is issued.

According to the process flow shown in FIG. 17, the intra-organization cooperation implementation program 50 first determines whether or not a person who issued the reference request has authority in step S91.

Assuming that a member of an organization is defined to reference only his or her own data, this determination process is performed by determining whether or not the member attempts to reference data of another member. Furthermore, assuming that members belonging to a department or a section to which also a member who has the data to be referenced belongs, this process is performed by making a comparison between a department or a section to which a member who issued a reference request belongs, and a department or a section to which a member having data to be referenced belongs. Or, this determination process is performed by determining whether or not the member who issues a reference request is registered as a person permitted to make a reference if a member permitted to make a reference is registered and managed in advance.

If it is determined that the person who issued the reference request is determined to be one having the authority ("YES" in step S91), the process goes to step S92, the reference request made by that person is permitted. If the person is not determined to have the authority ("NO" in step S91), the process goes to step S93 where the reference request made by that person is denied.

According to this process flow as described above, for example, it may be prohibited that a manager references data of his or her subordinate (such as the balance, labor time and cost required for providing a commodity etc.). Therefore, this process can prevent a subordinate from neglecting an original duty by attempting to obtain a good evaluation from a manager. Note that, however, it is possible to make the manager reference the balance of the subordinate on the condition that it is decreased.

FIG. 18 is a flowchart showing another implementation of the process flow performed by the intra-organization cooperation implementation program 50. This process flow is performed when a commodity receiver issues an electronic currency to a commodity provider.

According the process flow shown in FIG. 18, the process determines whether or not the intra-organization cooperation implementation program 50 first determines that a commodity provider receives electronic currency issued from a commodity receiver, after it updates the balance according to the above described method when they made a deal, in step S101. If "NO" in step S101, the process is terminated without making any operation. Therefore, the updated balance will be registered.

If "YES" in step S101, the process goes to step S102. In this step, the registered value of the balance of the commodity provider is reduced by decreasing the value of lending of the commodity provider depending on the amount of the electronic currency (it may be "0", depending on the amount), and at the same time, the registered value of the balance of the commodity receiver is increased by decreasing the value of borrowing of the commodity receiver (it may be "0", depending on the amount of the electronic currency).

According to this process flow as described above, it becomes possible to cancel the values of lending and borrowing by using electronic currency when the provision of labor or information within an organization is dealt with by using the values of lending and borrowing. Here, the electronic currency is adopted. However, the present invention can be implemented by adopting the configuration that a normal currency is exchanged, and a commodity provider or a commodity receiver inputs its amount.

With the intra-organization cooperation system, commodities are developed in a computer (or a plurality of computers) as described above. The location at which the commodities are placed is called a "shop". A commodity provider and a commodity receiver, that is, users, access this shop via an input device such as a terminal etc. The values of lending and borrowing registered when a certain commodity is provided are called "prices". The commodity provider recognizes his or her know-how, knowledge, providable service and labor as commodities, and exhibits them with the prices and specifications attached in the shop. The commodity receiver searches for his or her desired commodity from the shop.

When a deal request of a commodity such as information, labor etc., is issued within an organization, and it is determined that the probability of occurrence of association between a commodity provider and a commodity receiver is low, and the scale of the deal is small, the values of lending and borrowing incurred due to the commodity deal to be made are left unchanged. The balance defined as a difference between the values of lending and borrowing is updated at this time. If it is determined that the probability of occurrence of association is high, a part or a whole of the values of lending and borrowing are subtracted and the balance is updated. If it is determined that the scale of the deal is large, the deal itself is not permitted.

Since the registration of the values of lending and borrowing, which has almost the same effect as that of a currency exchange, is made when transaction cooperation is made between members in an organization, the same theory as that of the marketing economy, which is daily applied outside the organization, works. As a result, the organization functions cooperatively.

If the probability of occurrence of association is high in a range such as one department/section at such a time, sometimes the registration of lending and borrowing is not made although transaction cooperation is made. However, the problem where human relationships deteriorate does not occur in such a range. For transaction cooperation which requires considerable cost or labor, a loss due to an unsuccessful deal is large, or there is no time to engage in an original duty assigned by a manager. Or, it must be coped with by making an organization change or using the BPR. Since such a large-scale deal is prohibited, however, the above described problem will not occur.

In other words, even if transaction cooperation is made in a range such as the same department/section where association is made, neither lending nor borrowing is incurred. Therefore, the problem that the transaction cooperation is hesitated without paying an equivalent cost does not occur in such a range. For transaction cooperation which requires considerable cost and labor, a loss due to failure in transaction cooperation is large, or there is no time to engage in an original duty assigned by a manager. Or, it must be coped with by making an organization change or using the BPR. Because such a large-scale deal is prohibited, the above described problem will not occur.

Additionally, with the present system, it is determined whether the probability of occurrence of association between a commodity provider and a commodity receiver is either high or low, by using an affiliated department/section in a hierarchical organization. If members belong to the same section, or if they are a manager and a subordinate, it is determined that the affiliated sections are close and the probability of occurrence of association is high. Otherwise, it is determined that the affiliated sections are distant and the probability of occurrence of association is low. With this determination method, it can be easily determined whether the probability of occurrence of association between a commodity provider and a commodity receiver is either high or low.

Furthermore, with the present system, it is determined whether the probability of occurrence of association between a commodity provider and a commodity receiver is either high or low by examining the scale of a deal or its continuity. If deals are frequently made although affiliated sections are distant, the probability of occurrence of association is determined to be high. As described above, it can be easily determined whether the probability of occurrence of association between a commodity provider and a commodity receiver is either high or low. Even if association exists although the affiliated sections are different, the probability can be properly determined. The determination method may be combined with the above described method using affiliated departments/sections, and the probability of occurrence of association may be determined to be high if any of the conditions are satisfied. Furthermore, the probability may be determined to be high only when the direction of a deal is bidirectional. If the probability of occurrence of association is determined to be high, both commodity provider and commodity receiver are placed in close communication, or an arrangement is made so that both of them will belong to the same department/section.

Still further, with the present system, it is determined whether or not the scale of a deal is large by setting an upper limit for a total of values of lending incurred due to the provision of commodities. For example, the upper limit is set by multiplying the total labor time and cost (converted into either of them) required for providing a commodity by 10. The upper limit may be set not by using a constant multiple, but by calculating a polynomial. In addition, the labor time and cost may be separately handled. If the total values of lending exceeds the upper limit, the scale of the deal is determined to be large. At this time, the values of lending and borrowing will not be registered, or registered after being subtracted. Or, the deal itself is prohibited. Note that an unregistered value may be subject to tax on an organization.

Still further, it is determined whether or not the scale of a deal is large by setting an upper limit for the value of lending incurred due to the provision of a commodity. For example, the upper limit is set as a preset constant. If the value of lending itself (not the total) exceeds the upper limit, the scale of the deal is determined to be large, and the deal itself is prohibited.

With the above described method, it can be easily determined whether the scale of a deal is large. It is helpful to spread a popular commodity among many people with a small value of borrowing. After lending, which is sufficient to compensate for the labor for providing such a good and popular commodity, is provided to the person who provided the commodity, the incentive to newly provide another good commodity is given. Additionally, the incentive to underestimate and declare the labor and cost required for providing a commodity is reduced.

Still further, an upper limit is set for the labor time and cost that a commodity provider requires to provide a commodity in a predetermined period. For a commodity which exceeds the upper limit, the scale of the deal is determined to be large, and the deal itself is prohibited.

With this process, it can be easily determined whether or not the scale of a deal is large. By prohibiting a commodity generated by a person who is too eager to provide a commodity, behavior which deviates from an original duty can be eliminated.

The above described upper limit is adjusted according to the past record of the provision of commodities, so that an advantage will be offered to a commodity provider who gets results. The results of providing commodities can be obtained by making a comparison between the labor time and cost required for providing a commodity and the total value of their lending. If the latter is larger than the former, a commodity provider will be black-ink (earn a profit). Accordingly, the upper limit is raised. If the former is larger than the latter, the commodity provider will be red-ink. The upper limit is lowered in this case. It means that a commodity receiver who gets results will be treated favorably. If the difference between both of the values is not large, the upper limit may be left unchanged. Besides, it is desirable that the determination of results is made regularly.

With this process, a person who is not suited to the provision of a commodity handled by the present system is made to return to his or her original duty, while a person who is suited to such provision is made to make further provision. As a result, the right man can be put in the right place, and losses caused due to failure in provision can be reduced in terms of probability. In addition, it is possible not to handle a commodity to be performed via a manager-to-subordinate route (top-down instruction channel).

Still further, with the present system, a commodity to be performed via a manager-to-subordinate route is not handled by determining whether or not to permit the registration of a commodity to be dealt when a commodity provider issues a registration request of the commodity.

In this determination method, an upper limit is set for labor time and cost that a commodity provider requires to provide a commodity, and a commodity which exceeds the upper limit is not registered and exhibited in a shop.

In this way, it is possible not to handle a commodity to be performed via a manager-to-subordinate route by unregistering a commodity which required a prime cost. Additionally, an advantage of providing a commodity may be removed by determining the scale of a deal to be large, or the deal may be substantially prohibited by making a punishment rule.

Still further, in the determination method, an upper limit is set for labor time and cost that a commodity provider requires to provide a commodity in a predetermined period, and the commodity provider who provides a commodity beyond the upper limit is not permitted to register further commodities, so that the commodity provided by that commodity provider is not exhibited in a shop. In this way, a commodity generated by a person who is too eager to provide a commodity handled by the present invention, will not be registered, thereby eliminating behavior which deviates from the original duty. Additionally, the commodity may be registered, and the advantage of providing the commodity may be removed by determining the scale of the deal to be large. Or, the deal may be substantially prohibited by making a punishment rule.

Still further, an advantage is offered to a commodity provider who gets results by adjusting the above described upper limit according to the past results of the provision of commodities. The results of the provision of commodities can be obtained by making a comparison between the labor time and cost required for providing a commodity and the total values of lending. If the latter is larger than the former, the commodity provider will be black-ink. The upper limit is raised in this case. If the former is larger than the latter, the commodity provider will be red-ink, and the upper limit is lowered. As a result, a commodity provider who gets results will be treated favorably. If the difference between these two values is not large, the upper limit may be left unchanged. It is desirable that the determination of results is made regularly.

With this process, a person who is not suited to the provision of a commodity handled by the present system is made to return to his or her original duty, while a person who is suited to such provision is made to make further provision. As a result, the right man can be put in the right place, and losses caused due to failure in provision can be reduced in terms of probability.

Still further, with the present system, a deal is made while leaving the values of lending and borrowing unchanged if it cannot be determined whether or not the probability of occurrence of association between a commodity provider and a commodity receiver, or if it cannot be determined whether or not the scale of a deal is large. After the deal, the values of lending and borrowing are adjusted when the probability of occurrence of association is determined to be high, or when the scale of the deal is determined to be large. For example, whether or not the probability of occurrence of association is determined according to the number of deals. If the probability of occurrence of association which is first determined to be low because of the small number of deals, will be later determined to be high because of an increase of the number of deals, the values of lending and borrowing incurred due to the deal made when the probability of occurrence of association is determined to be low, will be retroactively adjusted. This adjustment process may revert to the starting point of registration, or to a predetermined point.

In this way, a deal can be made even if it cannot be determined whether or not the probability of occurrence of association between a commodity provider and a commodity receiver is high, or even if the scale of a deal cannot be determined.

Still further, with the present system, a price of a commodity is expressed using not a constant but an expression. For example, the number of people who purchased commodities is used as a variable. At this time, the price is calculated from the number of people who purchased the commodities. A person who previously made a purchase paid a price higher than the current one. In this case, the difference between the two prices is repaid to a person who made a purchase at a higher price. Whether or not the difference is repaid may be defined at the time of a first purchase. Accordingly, it is no longer required that a commodity receiver refrains from making a purchase in consideration of a future drop in price. As occasion demands, the incentive to make a purchase earlier may be provided by repaying a higher price to a person who made a purchase at an early stage, or repaying an amount of money more than the purchase price.

The price may be varied depending on a commodity receiver or the section of the commodity receiver. For example, "100" for a member belonging to a section "A", and "200" for a member belonging to another section. Or, the price may be varied according to the number of commodities to be purchased. For example, "100" per commodity when ten or more commodities are purchased, and "150" per commodity for less than ten. Additionally, the price may be equally divided by the number of purchasers within one section. For example, 300/number of purchasers within one section. These conditions may be applied depending on the case. Otherwise, a commodity receiver may be made to select his or her desired price system. As a matter of course, it may be explicitly stated at the start that repayment will not be made.

Additionally, a questionnaire means may be prepared so as to set a price based on its results. For example, a questionnaire for asking "At what price or lower will you make a purchase?" is conducted, and the price which incurs the largest value of lending to a commodity provider, may be set. Further, it may be defined that repayment is secured, a slightly higher price is first set, and it is gradually lowered. It may be further defined that if lowering the price increases the number of purchasers, which also increases the sales, the price may be further lowered, and a price at which the sale increase stops is set as a final price. This definition allows a commodity provider to obtain a price at which the commodity provider can gain the highest sales.

With this process, a deal with which all members can refrain from being provided, or a deal which causes a loss to all the members can be avoided. As a result, a case where a commodity provider sets too large a value of borrowing, so that not only a commodity receiver but also the commodity provider will suffer a loss can be avoided.

Still further, with the present system, the value of borrowing incurred by a second or subsequent deals is not registered to a commodity receiver when the commodity receiver makes a deal of one commodity many times. Since a commodity provider does not require his or her labor for providing the commodity in and after the second deal, the values of lending and borrowing will reflect the labor time and cost spent by the commodity provider more accurately with this process. The values of lending and borrowing may be registered not as the values incurred by the first provision of a commodity, but as the values of a transfer of a right of a first use, and the values of lending and borrowing after a second use may not be registered, so that a similar effect can be anticipated.

With this process, a commodity which does not incur a cost when being copied can be used as a commodity which incurs the values of lending and borrowing suitable for the provision of the commodity itself. Furthermore, it can prevent a commodity receiver from wasting his or her labor or resources for managing provided information. Even if the information includes an error or a change, it can be modified with ease.

Since a commodity provider may sometimes use part of a commodity or use the commodity in a predetermined period, a method for registering the values of lending and borrowing when the commodity is provided in and after the second deal, may be prepared and used together depending on the nature of the commodity. In other words, since there is a commodity whose portion only is used, or a commodity to be used only in a predetermined period (for example, a database search), the values of lending and borrowing may be registered in and after the second time for such a commodity. Whether to use either or both of the values is determined depending on the nature of a commodity.

Still further, with the present system, a commodity receiver must secure the provision of labor time corresponding to the value of borrowing when the value of borrowing is registered to the commodity receiver and he or she cannot make repayment. With this process, it is difficult for the commodity receiver to undertake unlimited borrowing, thereby stabilizing the values of lending and borrowing.

In this way, excessive borrowing can be prevented, thereby stabilizing the values of lending and borrowing.

Since it is troublesome to make a commodity receiver secure the provision of labor each time a commodity is provided, borrowing may be first made from financial facilities such as a bank, and the borrowed value may be used as the value of borrowing of the commodity receiver by demanding equivalent security at that time. In this case, there is no need to demand the security of the commodity receiver each time the commodity is provided. Note that a repayment limit may be set so as to secure the fulfillment of the provision of labor.

Still further, with the present system, an upper limit is set depending on the commodity receiver so as to prevent the commodity receiver from undertaking further borrowing, when the value of borrowing is registered to the commodity receiver. With this process, a commodity provider on a lending side can be protected against loss even if the commodity receiver cannot make repayment. As a result, the values of lending and borrowing can be stabilized.

In this way, excessive borrowing can be prevented, thereby stabilizing the values of lending and borrowing.

Since it is troublesome to check each time a commodity is provided, borrowing whose value is equal to or lower than an upper limit may be first made from financial facilities such as a bank, and a similar check may be made. Then, the borrowed value may be used as the value of borrowing of a commodity receiver. In this case, there is no need to check each time a commodity is provided. Interest may be given or a repayment limit may be set so as to secure the fulfillment of the provision of labor.

Still further, with the present system, a commodity receiver does not know the name of the commodity provider due to the commodity provider's anonymity when a commodity is provided. If it is erroneously determined that the probability of occurrence of association is low, although there is an association between the commodity provider and the commodity receiver, a deal can be made without having a bad influence on the relationship between both parties. Furthermore, a commodity receiver may be made anonymous to a commodity provider. In this case, critical opinions can be collected without having a bad influence on their relationship.

In this way, if it is erroneously determined that the probability of occurrence of association between a commodity provider and a commodity receiver is low, although an association actually exists between them, deterioration in their relationship can be prevented. A bad reputation due to the unsuccessful deal of a commodity can be prevented from having a bad influence on the original duty of a member. Furthermore, there is the effect that the provision of a commodity which requires a sense of value significantly different from that of the original duty, can be facilitated Still further, with the present system, a commodity receiver does not know who provides a commodity by assigning a temporary name, called a brand name, to the commodity provider when the commodity is provided. This process reduces the possibility of fraud, selfish behavior and misuse of anonymity. In addition, an incentive to behave responsibly is given to the commodity provider. The brand name may be prohibited from being changed, or a commodity, of which the real name is known, may be prohibited from being used. Otherwise, the brand name may not be assigned to a commodity which seems to be of low quality.

In this way, selfish behavior, fraud or provision of a tricky commodity can be prevented, and there is the effect that an incentive to behave responsibly is given to the commodity provider.

Still further, with the present system, a commodity receiver is made to input his or her subjective impression of a dealt commodity, which can be referenced by everybody. With this process, everybody can assess the quality of the commodity. An impression of a commodity provider or an objection to or opinion of the commodity provider against the impression of the commodity receiver may be input. Additionally, the impression may be limited to a value according to a 5-grade evaluation. Furthermore, it may be facilitated to reference an evaluation value etc., by using reliability based on statistical data, or by comparison with another commodity or another person.

As described above, there is the effect that selfish behavior, fraud or the provision of a tricky commodity can be prevented. Furthermore, an anonymous person or a first person can be prevented from behaving selfishly, and at the same time, the need for a commodity receiver to remember a brand name is eliminated. Moreover, there is the effect that the incentive to behave responsibly is given to the commodity provider.

Still further, with the present system, anybody can improve or modify a commodity provided by somebody, and then provide it as another commodity. For this implementation, also a person who improves or modifies a commodity is provided with a value of lending. Assume that a commodity provider "B" improves a commodity "a" provided by a commodity provider "A", and generates a commodity "b". At this time, the value of lending is registered to both commodity providers "A" and "B" when a commodity receiver "C" is provided with the commodity "b".

Since the value of lending is registered to the commodity provider "A" if the commodity "a" generated by the commodity provider "A" himself is provided, or if the commodity "b" modified by the commodity provider "B" is provided, the behavior of the commodity provider "B" does not become disadvantageous to the commodity provider "A". Accordingly, the commodity provider "B" will be able to provide the modified commodity "b" without obtaining the permission of the commodity provider "A".

As the form of the commodity "b", a commodity to which a change is made may be used, or only a difference from the commodity "a" may be provided and purchased by a commodity receiver, who will make a change based on the difference. In both cases, the value of lending registered to the commodity provide "A" is the same. In addition, the commodity receiver may purchase either the commodity "a" or the commodity "b" which is modified and more expensive.

As described above, everybody can arbitrarily change another person's commodity while giving an advantage to the original commodity provider. Besides, there is the effect that an incentive to provide a commodity or information which facilitates modification made by another person, is given.

Still further, with the present system, a manager cannot reference the values of lending and borrowing of his or her subordinates. This prevents the manager from evaluating the subordinate according to the value of lending and borrowing. Therefore, the manager evaluates the subordinate based on how he or she performed a task assigned by the manager as usual. As a result, the subordinate will have the incentive to make lending and borrowing which are helpful only for the task assigned by the manager. As a result, increased value of lending can be prevented, and a task assigned by a manager is neglected so as to cancel the value of borrowing. In other words, the value of lending is prevented from being increased in disregard of an instruction issued by a manager in order to decrease the value of borrowing. In addition, a subordinate can be prevented from dedicating himself or herself to a commodity deal of the present invention without supervision of a manager. When a manager makes a reference, a partial limitation that a person who makes a reference is made anonymous may be imposed.

This process can eliminate the incentive to make an excessive deal which has a bad influence on an original duty.

Still further, with the present system, a currency is permitted to be exchanged when a commodity is provided, and the values of lending and borrowing are changed depending on the amount of the currency when it is exchanged. The registration of the values of lending and borrowing according to the present invention is very similar to the exchange of a currency. The values of lending and borrowing are cancelled by using the exchange of a currency. As a result, it can appear that no deal is made.

As described above, the present invention can be implemented by combining with an exchange of a currency.

What is claimed is:

1. An intra-organization cooperation system, comprising:
   computer processor means for processing deal data of a commodity which is provided from members belonging to an organization to accomplish an activity and is dealt between said members in the organization, wherein said commodity is lent and borrowed between said members;
   means for making said activity of said members cooperative by managing said deal data of a commodity;
   personal information registering means for registering a balance of lending and borrowing of commodities for each member belonging to an organization;
   commodity information storing means for storing commodity information of each commodity;
   first determining means for determining a degree of association between a commodity provider and a commodity receiver when a deal request of a commodity is issued;
   second determining means for determining a scale of a deal of the commodity;
   deciding means for deciding contents of the deal according to a result of determination made by said first and second determining means; and
   updating means for updating the balance registered to said personal information registering means according to the contents of the deal decided by said deciding means.

2. The intra-organization cooperation system according to claim 1, wherein said second determining means determines the scale of a deal of the commodity when a deal request of the commodity is issued.

3. The intra-organization cooperation system according to claim 1, wherein the commodity information includes at least a name, specification and a price of the commodity.

4. The intra-organization cooperation system according to claim 3, wherein
   said deciding means decides contents where a price stored in said commodity information storing means is used as a value of lending and borrowing incurred due to the deal of the commodity as it is, if said first determining means determines that a probability of occurrence of association is low, and/or if said second determining means determines that the scale of the deal is small; and
   said updating means updates the balance registered to said personal information registering means by using the value of lending and borrowing.

5. The intra-organization cooperation system according to claim 3, wherein
   said deciding means decides the contents where a value obtained by subtracting a part or a whole from the price stored in said commodity information storing means, as a value of lending and borrowing when the first determining means determines that a probability of occurrence of association is high, and/or when the second determining means determines that the scale of the deal is equal to or larger than a predetermined scale; and
   said updating means updates the balance registered to said personal information storing means by using the values of lending and borrowing.

6. The intra-organization cooperation system according to claim 1, wherein
   said deciding means decides the contents where the deal of the commodity itself is prohibited if said second determining means determines that the scale of the deal is large.

7. The intra-organization cooperation system according to claim 1, wherein
   said first determining means determines the degree of association between the commodity provider and the commodity receiver based on a department/a section which the commodity provider of the commodity, to which the deal request is issued, belongs to, and a department/a section which the commodity receiver belongs to.

8. The intra-organization cooperation system according to claim 1, further comprising:
   deal registering means for registering a deal history of commodities.

9. The intra-organization cooperation system according to claim 8, wherein said first determining means determines the degree of association between the commodity provider and the commodity receiver based on the deal history registered to said deal registering means.

10. The intra-organization cooperation system according to claim 1, wherein said second determining means determines the scale of the deal by setting an upper limit of lending for each commodity from either or both labor and cost, required for providing the commodity, and determining whether or not the value of lending or a total of values of lending, which is incurred due to the deal of the commodity, exceeds the upper limit.

11. The intra-organization cooperation system according to claim 1, wherein said second determining means determines the scale of the deal by determining whether or not either or both labor and cost, required for providing the commodity, exceeds a stipulated upper limit.

12. The intra-organization cooperation system according to claim 1, wherein said second determining means determines the scale of the deal by determining whether or not either or both labor and cost, required for providing the commodity in a predetermined period, exceeds a stipulated upper limit.

13. The intra-organization cooperation system according to claim 11, wherein said second determining means performs a determination process by raising an upper limit for a black-ink commodity provider, and lowering the upper limit for a red-ink commodity provider.

14. The intra-organization cooperation system according to claim 12, wherein said second determining means performs a determination process by raising an upper limit for a black-ink commodity provider, and lowering the upper limit for a red-ink commodity provider.

15. The intra-organization cooperation system according to claim 1, further comprising:

second deciding means for deciding whether or not to permit registration of the commodity when the commodity provider issues a registration request of a commodity to be dealt.

16. The intra-organization cooperation system according to claim 15, wherein said second deciding means decides not to permit the registration of the commodity, when either or both of the labor and cost required for providing the commodity, to which the registration request is issued, exceeds a stipulated upper limit.

17. The intra-organization cooperation system according to claim 15, wherein said second deciding means decides not to permit the registration of the commodity to which the registration request is issued, when either or both of labor and cost that the commodity provider requires to provide the commodity in a certain period, exceeds a stipulated upper limit.

18. The intra-organization cooperation system according to claim 16, wherein said second deciding means performs a determination process by raising the upper limit for a black-ink commodity provider, and lowering the upper limit for a red-ink commodity provider.

19. The intra-organization cooperation system according to claim 17, wherein said second deciding means performs a determination process by raising the upper limit for a black-ink commodity provider, and lowering the upper limit for a red-ink commodity provider.

20. The intra-organization cooperation system according to claim 3, wherein said deciding means temporarily decides the contents where the price stored in said commodity information storing means is used as a value of lending and borrowing incurred due to the deal of the commodity as it is, when the contents of the deal of the commodity cannot be decided; and further comprising modifying means for modifying data registered to said personal information registering means to be proper data when the temporary decision is proved to be erroneous.

21. The intra-organization cooperation system according to claim 1, further comprising:

setting means for setting a value of lending and borrowing of the commodity so that the value change; and second modifying means for modifying data registered to said personal information registering means so that the value of lending and borrowing incurred due to a deal prior to a change, will become a value according to the change, at the time of the change of the values of lending and borrowing, which is made by said setting means.

22. The intra-organization cooperation system according to claim 1, further comprising:

second setting means for setting a value of lending and borrowing of the commodity to "0" or a value close to "0", when a second deal or a subsequent deal of a same commodity is made to a same commodity receiver.

23. The intra-organization cooperation system according to claim 1, further comprising:

third setting means for allowing the balance registered to said personal information registering means to increase by permitting a debt on the condition that security is given.

24. The intra-organization cooperation system according to claim 1, further comprising:

prohibiting means for prohibiting a deal which incurs further borrowing, when the balance registered to said personal information registering means becomes a stipulated negative value or smaller.

25. The intra-organization cooperation system according to claim 1, further comprising:

displaying means for displaying a list of commodities to be provided while making commodity providers anonymous.

26. The intra-organization cooperation system according to claim 1, further comprising:

second displaying means for displaying a list of commodities to be provided while assigning temporary names to commodity providers.

27. The intra-organization cooperation system according to claim 1, further comprising:

obtaining means for obtaining reputation data of the commodity; and third displaying means for displaying the reputation data obtained by said obtaining means.

28. The intra-organization cooperation system according to claim 1, further comprising:

allotting means for allotting a value of lending, incurred due to the deal of the commodity, to both the commodity provider and a member, when the member, other than the commodity provider, changes the commodity provided by the commodity provider.

29. The intra-organization cooperation system according to claim 1, wherein said alotting means alots the value of lending also when the commodity is used as a part or when information or a service to supplement the commodity is changed.

30. The intra-organization cooperation system according to claim 1, further comprising:

rejecting means for rejecting a reference request of data registered to said registering means, which is issued by a member other than a member who is permitted to make a reference.

31. The intra-organization cooperation system according to claim 1, further comprising:

changing means for changing data registered to said registering means according to a currency, when the commodity receiver issues the currency to the commodity provider.

32. The intra-organization cooperation system according to claim 1, wherein said second determining means determines the scale of the deal of the commodity when a registration request of the commodity to be dealt is issued from the commodity provider.

33. The intra-organization cooperation system according to claim 1, wherein said second determining means determines the scale of the deal of the commodity when the deal request of the commodity is issued, and/or when a registration request of the commodity to be dealt is issued from the commodity provider.

34. An intra-organization cooperation system, comprising:

computer processor means for processing deal data of a commodity which is provided from members belonging to an organization to accomplish an activity and is dealt between said members in the organization, wherein said commodity is lent and borrowed between said members;

means for making said activity of said members cooperative by managing said deal data of the commodity;

commodity information storing means for storing commodity information of each commodity to be provided as a transaction support, other than a transaction which members belonging to the organization have to employ essentially in the organization; and personal information registering means for registering/updating value of lending and borrowing incurred due to a deal of a commodity, which are decided based on the commodity information of a commodity to be dealt each time a deal request is issued, in correspondence with each of the members belonging to the organization.

35. The intra-organization cooperation system according to claim 34, wherein the commodity information includes at least a name, a specification and a price of the commodity.

36. The intra-organization cooperation system according to claim 34, wherein the price of the commodity can be arbitrarily set by each commodity provider, and is decided based on supply and demand.

37. A commodity deal management method comprising the steps of:

processing deal data of a commodity which is provided from members belonging to an organization to accomplish an activity and is dealt between said members in the organization, wherein said commodity is lent and borrowed between said members;

making said activity of said members cooperative by managing said deal data of the commodity;

determining a degree of association between a provider and a receiver of a commodity, and/or a scale of a deal of the commodity; and deciding contents of the deal of the commodity according to results of determination of the degree of association and/or the scale of the deal of the commodity.

38. A computer-readable storage medium, when used by a computer, for making the computer perform the functions of:

storing commodity information of each commodity to be provided as a transaction support, other than a transaction which members belonging to an organization have to employ essentially in the organization; and registering a balance of lending and borrowing of commodities for each of members belonging to the organization.

39. A computer-readable storage medium, when used by a computer, for making the computer perform the functions of:

processing deal data of a commodity which is provided from members belonging to an organization to accomplish an activity and is dealt between said members in the organization, wherein said commodity is lent and borrowed between said members;

making said activity of said members cooperative by managing said deal data of the commodity;

determining a degree of association between a provider and a receiver of a commodity, and/or a scale of a deal of the commodity which is provided from members belonging to an organization to accomplish an activity and is dealt between said members in the organization; and deciding contents of the deal of the commodity according to results of determination of the degree of association and/or the scale of the deal of the commodity.

40. An intra-organization cooperation system for sharing labor or knowledge within an organization, comprising:

a commodity which can be labor or knowledge;

a database storing commodity information including prices of commodities;

an association device determining an association between a commodity provider and a commodity receiver;

an assessment device assessing a scale of a deal based upon size of risk of the deal;

a deciding device deciding on the success of the deal based upon the association and the assessed scale of the deal; and a valuation device, upon success of the deal, determining values of lending and borrowing according to commodity information in the database, which then updates the information in the database.

41. The intra-organization cooperation system for sharing labor or knowledge as claimed in claim 40, wherein the assessment device assesses the risk of the deal by setting an upper limit of lending for each commodity from either or both labor and cost, and determining whether the value of the lending exceeds the upper limit.

42. A method for managing commodities, which include labor and knowledge, within an organization, comprising:

storing commodity information in a database;

examining an association between a commodity provider and a commodity receiver;

examining a scale of a deal based upon risk of the deal;

determining whether to make the deal based upon the association and the scale of the deal; and upon determination to make the deal, making the deal by deciding values of lending and borrowing based on information in the database, and then updating the database.

43. A computer readable storage medium, storing a method for managing commodities, which include labor and knowledge, within an organization, comprising:

storing commodity information in a database;

examining an association between a commodity provider and a commodity receiver;

examining a scale of a deal based upon risk of the deal;

determining whether to make the deal based upon the association and the scale of the deal; and upon determination to make the deal, making the deal by deciding values of lending and borrowing based on information in the database, and then updating the database.

* * * * *

UNITED STATES PATENT AND TRADEMARK OFFICE
CERTIFICATE OF CORRECTION

PATENT NO.:       6,038,537
DATED       :     March 14, 2000
INVENTOR(S):      Hidetoshi MATSUOKA It is certified that an error appears in the above-identified patent and that said Letters Patent is hereby corrected as shown below:

Col. 33, Claim 21, line 4, change "change" to --changes--.

Signed and Sealed this

Thirtieth Day of January, 2001

Attest:

Q. TODD DICKINSON

Attesting Officer          Director of Patents and Trademarks